US012296352B1

(12) United States Patent
Banks et al.

(10) Patent No.: US 12,296,352 B1
(45) Date of Patent: May 13, 2025

(54) GARDEN HOSE SUPPORT DEVICE

(71) Applicant: Diane C. Banks, Columbus, OH (US)

(72) Inventors: Diane C. Banks, Columbus, OH (US); Steven A. Sauer, Columbus, OH (US); Christopher L. Brandon, Dublin, OH (US)

(73) Assignee: Diane C. Banks, Columbus, OH (US)

( * ) Notice: Subject to any disclaimer, the term of this patent is extended or adjusted under 35 U.S.C. 154(b) by 0 days.

(21) Appl. No.: 18/224,507

(22) Filed: Jul. 20, 2023

Related U.S. Application Data

(60) Provisional application No. 63/405,802, filed on Sep. 12, 2022.

(51) Int. Cl.
*B05B 15/622* (2018.01)
*A47G 7/04* (2006.01)

(52) U.S. Cl.
CPC ............ *B05B 15/622* (2018.02); *A47G 7/044* (2013.01)

(58) Field of Classification Search
CPC ..... B05B 15/622; B05B 15/625; B05B 15/62; B05B 15/65; B05B 1/262; B05B 15/654; A47G 7/044; A01G 9/12; A01G 9/122; A45F 3/44
USPC ........... 248/530, 57, 156, 533, 508; 239/276
See application file for complete search history.

(56) References Cited

U.S. PATENT DOCUMENTS 709,300 A * 9/1902 Buchtel ................. E04F 11/181 52/165
2,309,772 A 2/1943 Manassc
2,495,995 A 1/1950 Hewett et al.
5,088,666 A * 2/1992 Lang ....................... B05B 15/00 248/87
5,090,647 A 2/1992 Clarke
9,266,138 B1 2/2016 Massaro
9,371,940 B2 6/2016 Tilley
2004/0232276 A1 * 11/2004 Ferris ..................... B65H 57/06 242/615.3
2005/0184203 A1 8/2005 Votypka
(Continued)

FOREIGN PATENT DOCUMENTS

DE 810360 C * 8/1951 ............ B43M 15/00

OTHER PUBLICATIONS

"Mr Ironstone Garden Hose Holder", Amazon Website, Web page <https://www.amazon.com/dp/B09PL6P7YS/ref=sspa_dk_de-tail_2?psc=1&pd_rd_i=B09PL6P7YS&pd_rd_w=VuJSJ&con-tent-id=amzn1.sym.3481f441-61ac-4028-9c1a-7f9ce8ec50c5&pf_rd_p=3481f441-61ac-4028-9c1a-7f9ce8ec50c5&pf_rd_r=243FT9D9RNFH476WJD66&pd_rd_wg=b7iQu&pd_rd_r=8f566da8-b077-4be6-a10f-8337e0bb1d35&s=hi>, 9 pages, dated as early as Jun. 25, 2022, retrieved from www.amazon.com website on Aug. 19, 2023.

(Continued)

*Primary Examiner* — Tuongminh N Pham
*Assistant Examiner* — Juan C Barrera
(74) *Attorney, Agent, or Firm* — The Law Office of Patrick F. O'Reilly III, LLC

(57) ABSTRACT

A garden hose support device is disclosed herein. The garden hose support device includes a base portion, the base portion including at least one stake member for being inserted into the ground to stabilize the garden hose support device; a shaft portion connected to the base portion, the shaft portion having an upper end and a lower end, the lower end being oppositely disposed relative to the upper end, and the lower end being connected to the base portion; and a hose support member connected to the upper end of the shaft portion, the hose support member configured to support a garden hose in an elevated position above the ground.

21 Claims, 24 Drawing Sheets

(56) References Cited

U.S. PATENT DOCUMENTS

| | | | | |
|---|---|---|---|---|
| 2010/0006669 | A1* | 1/2010 | Thompson | B05B 15/622 239/200 |
| 2016/0116082 | A1* | 4/2016 | Tilley | F16L 3/003 248/82 |
| 2020/0016621 | A1* | 1/2020 | Chen | B05B 15/622 |
| 2022/0016659 | A1* | 1/2022 | Vaughan | B05B 15/622 |

OTHER PUBLICATIONS

"Rocky Mountain Goods Deluxe Hose Guide Spike", Amazon Website, Web page <https://www.amazon.com/Rocky-Mountain-Goods-Deluxe-Guide/dp/B07V3ZDKJW/ref=asc_df_B07V3ZDKJW/?tag=hyprod-20&linkCode=df0&hvadid=366315293950&hvpos=&hvnetw=g&hvrand=14916000058567344>, 7 pages, dated as early as Jun. 25, 2022, retrieved from www.amazon.com website on Aug. 19, 2023.

"Titan Attachments Bolt-On Hose Hanger Green", Amazon Website, Web page <https://www.amazon.com/Titan-Attachments-Bolt-On-Hanger-Green/dp/B075JNYLKH/ref=asc_df_B075JNYLKH/?tag=hyprod-20&linkCode=df0&hvadid=416949847877&hvpos=&hvnetw=g&hvrand=3687656162720772325&hvpone>, 7 pages, dated Sep. 11, 2017, retrieved from www.amazon.com website on Aug. 19, 2023.

* cited by examiner

SECTION B-B

Detail "C"

Detail "D"

SECTION C-C

SECTION C-C

GARDEN HOSE SUPPORT DEVICE

CROSS-REFERENCE TO RELATED APPLICATIONS

This patent application claims priority to, and incorporates by reference in its entirety, U.S. Provisional Patent Application No. 63/405,802, entitled “Garden Hose Support Device”, filed on Sep. 12, 2022.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a garden hose support device. More particularly, the invention relates to a garden hose support device for supporting a garden hose in an elevated position above the ground.

2. Background

Garden hoses are often used to water various plants, such as flowers and shrubs, around the yard of one’s home. However, garden hoses are readily susceptible to getting tangled up around these plants when the hoses are moved to the various locations that need to be watered. In some cases, the tangled garden hoses even pull these plants out of the ground, causing them to die. In addition to these problems, typical garden hoses have to be manually held by a user in order to deliver water downwardly onto plants. This results in the laborious holding of the garden hose in an elevated position by the user for each plant that requires watering.

Therefore, what is needed is a garden hose support device that supports a garden hose in an elevated position above the ground so that the garden hose is less likely to become tangled on the plants that are being watered using the hose. In addition, a garden hose support device is needed that holds the garden hose in an elevated position above the ground so as to obviate the need for the manual holding of the garden hose by a user.

BRIEF SUMMARY OF EMBODIMENTS OF THE INVENTION

Accordingly, the present invention is directed to a garden hose support device that substantially obviates one or more problems resulting from the limitations and deficiencies of the related art.

In accordance with one or more embodiments of the present invention, there is provided a garden hose support device that includes a base portion, the base portion including at least one stake member for being inserted into the ground to stabilize the garden hose support device; a shaft portion connected to the base portion, the shaft portion having an upper end and a lower end, the lower end being oppositely disposed relative to the upper end, and the lower end being connected to the base portion; and a hose support member connected to the upper end of the shaft portion, the hose support member configured to support a garden hose in an elevated position above the ground.

In a further embodiment of the present invention, the base portion comprises a central section and a plurality of peripheral sections extending outwardly from the central section; and the at least one stake member of the base portion further comprises a plurality of stake members, each of the plurality of stake members being provided in a respective one of the plurality of peripheral sections of the base portion.

In yet a further embodiment, the base portion has a footprint that is substantially X-shaped; and the at least one stake member of the base portion comprises a central stake member disposed in the approximate center of the X-shaped base portion.

In still a further embodiment, the at least one stake member of the base portion further comprises a plurality of peripheral stake members, each of the plurality of peripheral stake members being provided proximate to a respective end of the X-shaped base portion.

In yet a further embodiment, the central stake member has a length that is substantially greater than the lengths of the peripheral stake members.

In still a further embodiment, a height of the shaft portion is adjustable.

In yet a further embodiment, the shaft portion comprises an upper tubular member telescopically received on a lower tubular member, the height of the shaft portion being adjustable by means of the telescopic engagement between the upper tubular member and the lower tubular member.

In still a further embodiment, the garden hose support device further comprises a securement device being configured to prevent a relative sliding movement of the upper tubular member relative to the lower tubular member so as to maintain a position of the upper tubular member relative to the lower tubular member.

In yet a further embodiment, the securement device comprises a spring clip with a detent and the upper tubular member comprises a plurality of spaced-apart apertures disposed along a length of the upper tubular member, the detent of the spring clip configured to be selectively engaged with one of the plurality of spaced-apart apertures along the length of the upper tubular member so as to set the height of the shaft portion, and the spring clip configured to be disengaged by means of a user applying a force to an outer surface of the detent so that the upper tubular member is able to be adjusted relative to the lower tubular member.

In still a further embodiment, the securement device comprises a twist lock collar having an inner threaded collar portion and an outer threaded collar portion threadingly engaged with the inner threaded collar portion, the upper tubular member configured to be adjusted relative to the lower tubular member when the outer threaded collar is rotated in a first loosening direction, and the position of the upper tubular member relative to the lower tubular member is configured to be fixed when the outer threaded collar is rotated in a second tightening direction that is opposite to the first loosening direction.

In yet a further embodiment, the securement device comprises a ring member coupled to the lower tubular member and an annular shroud member disposed on a lower end of the upper tubular member, the annular shroud member configured to rest on top of the ring member, the ring member configured to be selectively placed along a length of the lower tubular member by a user so as to set the height of the shaft portion, and the ring member configured to prevent the upper tubular member from sliding downward on the lower tubular member so that the height of the shaft portion is maintained.

In still a further embodiment, the securement device comprises a cam locking device that includes an eccentric cylindrical component disposed inside of the upper tubular member, the eccentric cylindrical component of the cam locking device configured to frictionally engage an inner wall surface of the upper tubular member so as to prevent the upper tubular member from sliding downward on the lower tubular member so that the height of the shaft portion is maintained.

In yet a further embodiment, the hose support member is in a form of a spiraled clip member defining one or more voids for receiving a portion of the garden hose therein.

In still a further embodiment, the hose support member is detachable from the upper end of the shaft portion so that one or more additional garden accessories are able to be selectively attached to the upper end of the shaft portion, the one or more additional garden accessories including a sprinkler head attachment.

In yet a further embodiment, the hose support member is in a form of an eyelet defining a hole for receiving a portion of the garden hose therein.

In still a further embodiment, the hose support member is rotatable relative to the shaft portion about a vertical axis.

In yet a further embodiment, the hose support member is in a form of a yoke for receiving a portion of the garden hose therein.

In still a further embodiment, the garden hose support device further comprises one or more hanger support devices configured to be attached along a length of the shaft portion, the one or more hanger support devices configured to support one or more objects in a cantilevered manner from the shaft portion of the garden hose support device.

In yet a further embodiment, the one or more hanger support devices comprises a hose hook device for hanging a portion of the garden hose on the shaft portion of the garden hose support device.

In still a further embodiment, the one or more hanger support devices comprises a plant pot holder for hanging a plant pot on the shaft portion of the garden hose support device.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
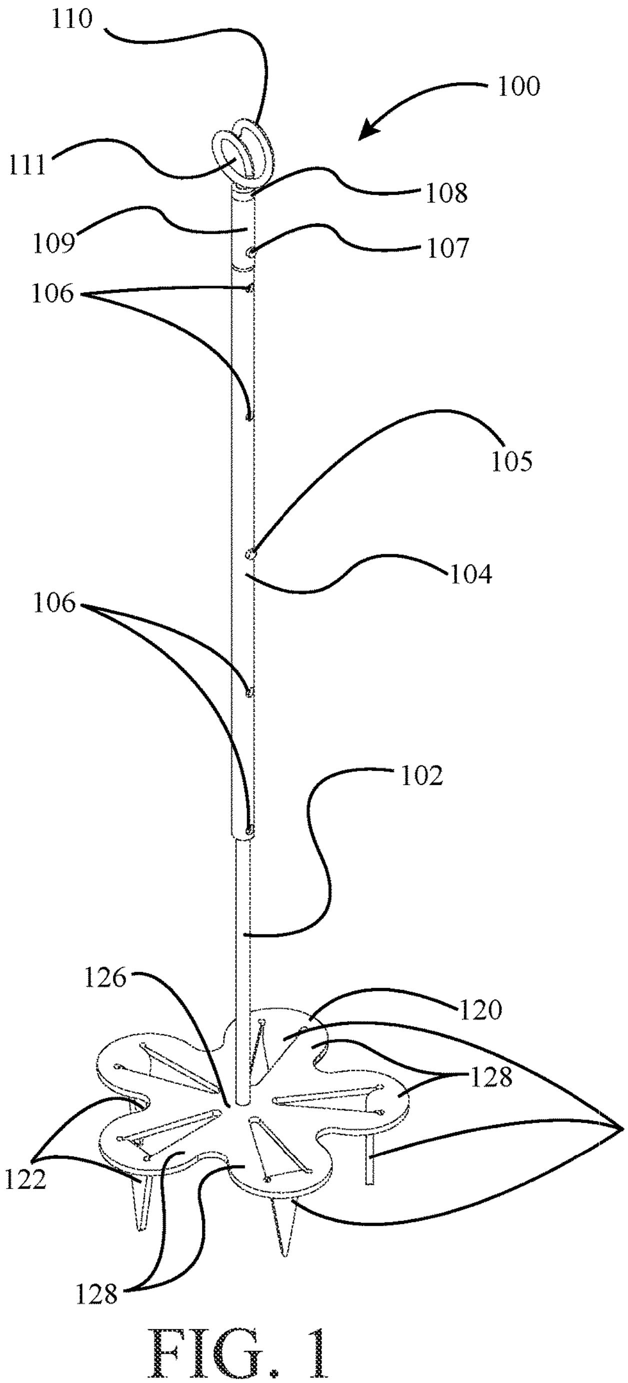
FIG. 1 is a top-side perspective view of a garden hose support device, according to a first illustrative embodiment of the invention.

A first illustrative embodiment of a garden hose support device is seen generally at 100 in FIGS. 1-4 and 7. Initially, as shown in the perspective view of FIG. 1, the illustrative garden hose support device 100 generally comprises a base portion 120, the base portion 120 including at least one stake member 122 for being inserted into the ground to stabilize the garden hose support device 100; a shaft portion 102, 104 connected to the base portion 120, the shaft portion 102, 104 having an upper end and a lower end, the lower end being oppositely disposed relative to the upper end, and the lower end being connected to the base portion 120; and a hose support member 110 connected to the upper end of the shaft portion 102, 104, the hose support member 110 configured to support a garden hose in an elevated position above the ground. As will be explained hereinafter, in first illustrative embodiment, the garden hose support device 100 has a flower-shaped base, a spring clip height adjustment assembly, and an interchangeable top piece.

Figure 2:
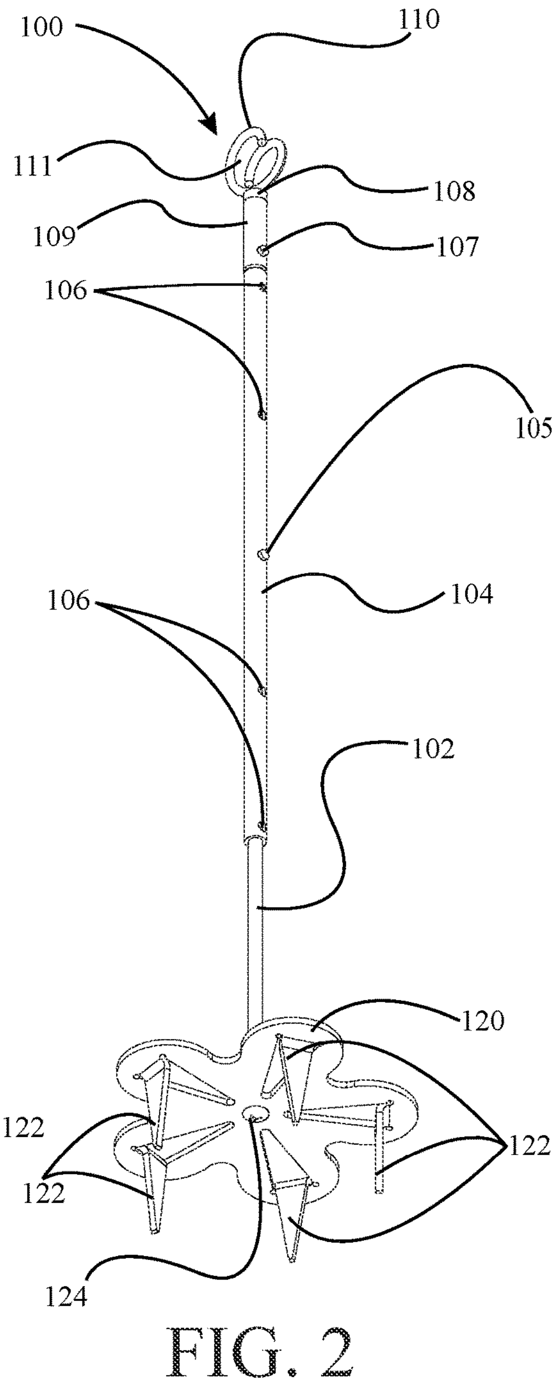
FIG. 2 is a bottom-side perspective view of the garden hose support device of FIG. 1.
Figure 3:
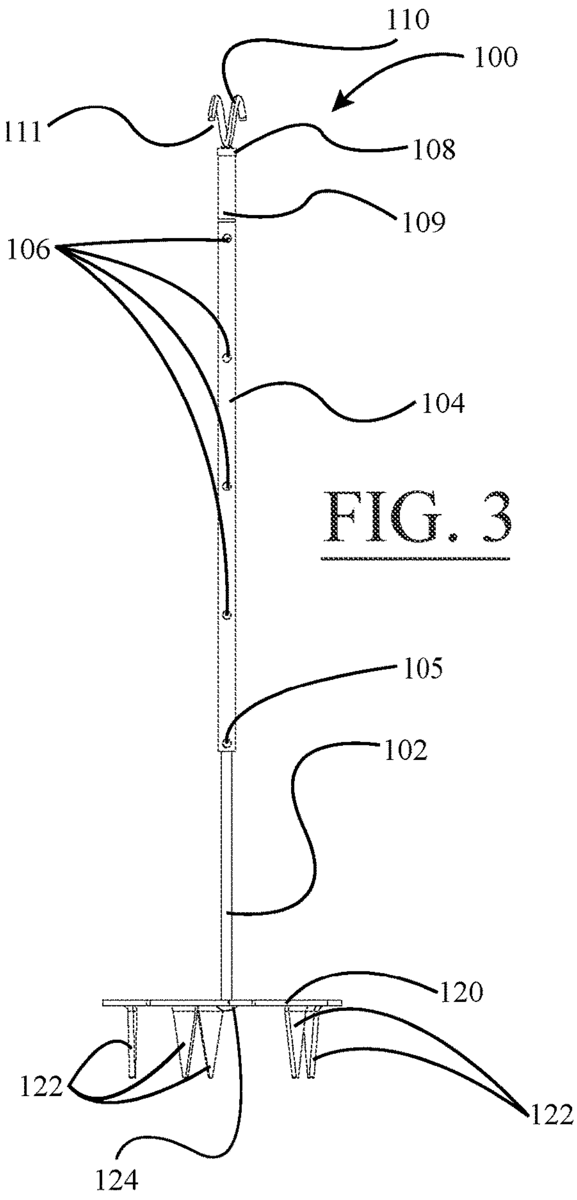
FIG. 3 is a front elevational view of the garden hose support device of FIG. 1.
Figure 4:
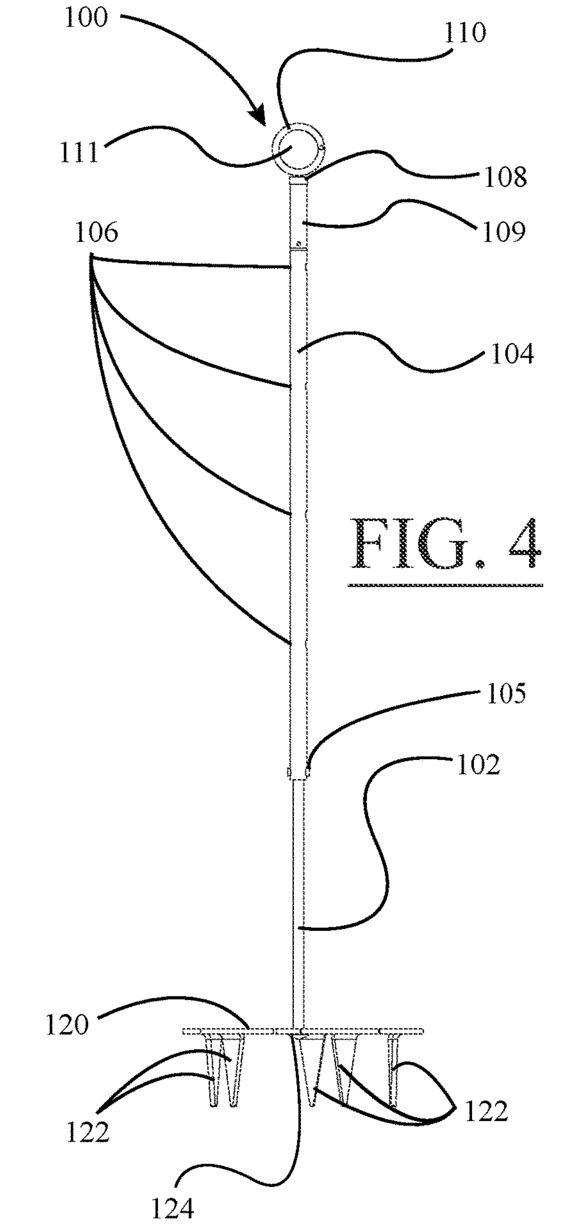
FIG. 4 is a side elevational view of the garden hose support device of FIG. 1.
Figure 5:
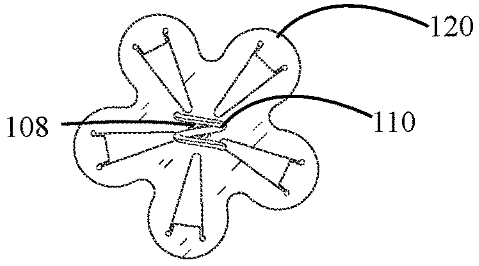
FIG. 5 is a top plan view of the garden hose support device of FIG. 1.
Figure 6:
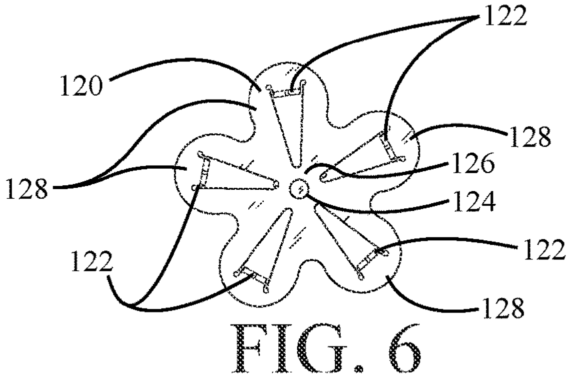
FIG. 6 is a bottom plan view of the garden hose support device of FIG. 1.

Now, with combined reference to the first illustrative embodiment of FIGS. 1 and 2, it can be seen that the base portion 120 comprises a base plate resembling the shape of a flower with a central section 126 and a plurality of peripheral sections 128 extending outwardly from the central section 126. As shown in FIGS. 1 and 2, the base portion 120 of the garden hose support device 100 further comprises a plurality of stake members 122, where each of the plurality of stake members 122 is provided in a respective one of the plurality of peripheral sections 128 of the base portion 120. In the first illustrative embodiment, each of the plurality of stake members 122 may be in a form of a bent, triangular spike that is stamped from the flowered-shaped base plate.

Figure 7:
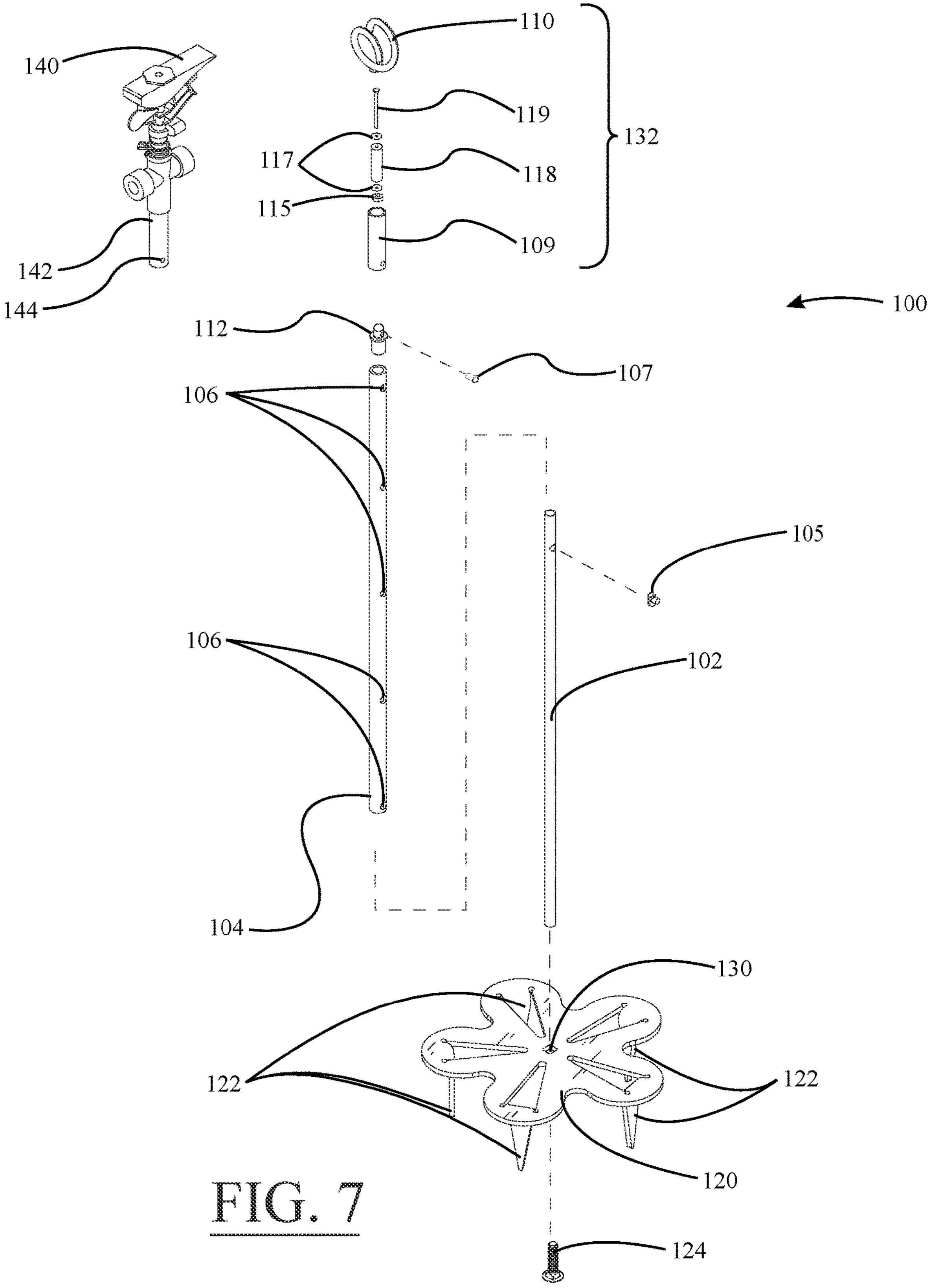
FIG. 7 is an exploded perspective view of the garden hose support device of FIG. 1, wherein an alternative garden hose accessory (e.g., a sprinkler head) is also depicted to illustrate that accessories can be interchangeable.

Next, referring again to the first illustrative embodiment of FIGS. 1-4 and 7, it can be seen that the shaft portion 102, 104 of the garden hose support device 100 has an adjustable length, and connects the flower-shaped base portion 120 to the hose support member 110 at the top of the garden hose support device 100. As shown in FIGS. 2 and 7, the flower-shaped base portion 120 may be attached to the shaft portion 102, 104 by a fastener member 124 (e.g., in a form of a carriage bolt). The shaft of the fastener member 124 (e.g., carriage bolt) passes through the fastener aperture 130 in the flower-shaped base portion 120. Advantageously, the adjustable length of the shaft portion 102, 104 of the garden hose support device 100 allows the hose support member 110 at the top of the garden hose support device 100 to be adjustable relative to the ground for accommodating various plant watering applications.

With reference again to FIGS. 1, 2, and 7 of the first illustrative embodiment, it can be seen that the adjustable shaft portion 102, 104 comprises a larger diameter upper tubular member 104 telescopically received on a smaller diameter lower tubular member 102. The height of the shaft portion 102, 104 is adjustable by means of the telescopic engagement between the upper tubular member 104 and the lower tubular member 102 (i.e., the displaceable upper tubular member 104 slides up and down on the stationary lower tubular member 102). Also, as shown in FIGS. 1, 2, and 7, the garden hose support device 100 further comprises a securement device 105 being configured to prevent a relative sliding movement of the upper tubular member 104 relative to the lower tubular member 102 so as to maintain a position of the upper tubular member 104 relative to the lower tubular member 102. In the first illustrative embodiment, the securement device 105 is in a form of a spring clip with a detent (refer to FIG. 7) and the upper tubular member 104 comprises a plurality of spaced-apart apertures 106 disposed along a length of the upper tubular member 104 (see FIG. 7). The detent of the spring clip 105 is configured to be selectively engaged with one of the plurality of spaced-apart apertures 106 along the length of the upper tubular member 104 so as to set the height of the shaft portion 102, 104, and the spring clip 105 is configured to be disengaged by means of a user applying a force to an outer surface of the detent so that the upper tubular member 104 is able to be adjusted relative to the lower tubular member 102. In the first illustrative embodiment, the upper tubular member 104 has five (5) different height adjustment settings based upon the engagement of the detent of the spring clip 105 with a selected one of the five (5) height adjustment apertures 106. For example, the length of the shaft portion 102, 104 of the garden hose support device 100 may be adjustable between approximately 12 inches and approximately 24 inches, inclusive of the endpoints (or between 12 inches and 24 inches, inclusive of the endpoints).

Figure 20:
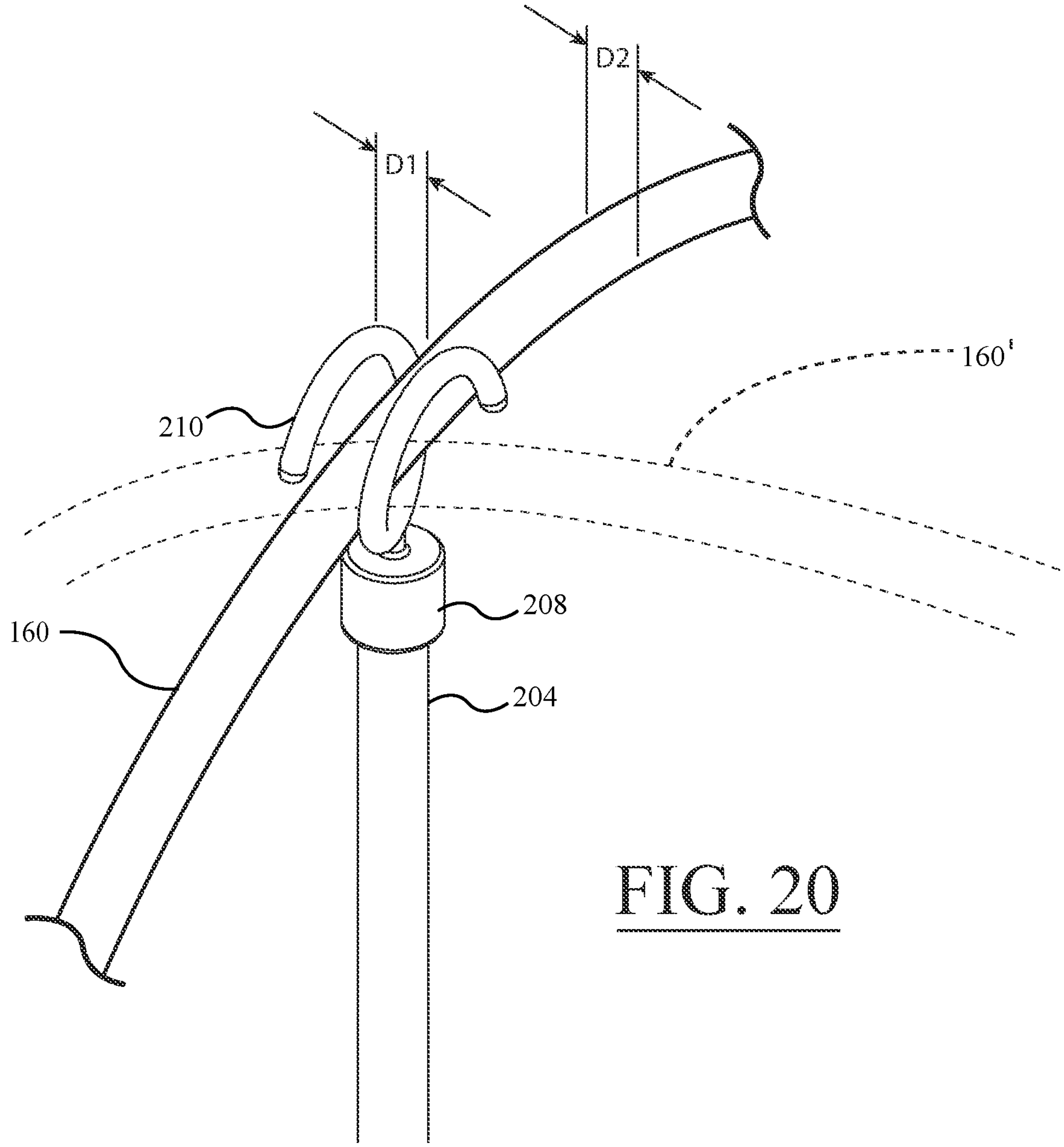
FIG. 20 is an enlarged perspective view of the hose support member of the garden hose support device of FIG. 9, wherein a garden hose is shown being supported in the hose support member.

In the first illustrative embodiment, referring to FIGS. 1, 2, and 7, it can be seen that the hose support member 110 of the garden hose support device 100 is in a form of a spiraled clip member defining one or more voids 111 for receiving a portion of the garden hose 160 therein (see e.g., FIG. 20).

Alternative positions of garden hoses 160, 160' in the spiraled clip member are depicted in FIG. 20. Advantageously, the spiraled clip member captures and holds the garden hose 160, 160' therein. Also, in the illustrative embodiment, the hose support member 110 is rotatable relative to the shaft portion 102, 104 about a vertical axis (i.e., the swivel base piece 108 rotates on the upper end of the upper tubular member 104—see FIG. 7).

Referring again to the exploded view of FIG. 7, it can be seen that, in the first illustrative embodiment, the hose support member 110 is part of a garden hose support assembly 132 where the hose support member 110 is mounted on a swivel base piece 108 (see FIGS. 1 and 2) that is attached to the press fit tube 118 by means of a bolt 119 and nut 115. In addition, washers 117 are provided on opposed ends of the press fit tube 118 in the illustrative embodiment (see FIG. 7). The press fit tube 118 is configured to be inserted into the upper end of the outer top attachment pole piece 109 in an interference-type fit, and then the outer top attachment pole piece 109 is attached to the upper end of the upper tubular member 104 by means of a pole attachment component 112 with a smaller diameter upper portion that fits into the central cavity of the outer top attachment pole piece 109, and a larger diameter lower portion that fits into the upper end of the upper tubular member 104 (refer to FIG. 7). Also, as shown in the illustrative embodiment of FIG. 7, the outer top attachment pole piece 109 is removably attached to the pole attachment component 112 by a ball plunger member 107 (i.e., pushing inwardly on the ball portion of the ball plunger member 107 will enable the garden hose support assembly 132 to be detached from the upper end of the upper tubular member 104.

In the first illustrative embodiment, as shown in FIG. 7, the hose support member 110 is detachable from the upper end of the upper tubular member 104 so that one or more additional garden accessories are able to be selectively attached to the upper end of the upper tubular member 104. For example, in the illustrative embodiment, the one or more additional garden accessories may include a sprinkler head attachment 140. In the illustrative embodiment, a user may remove the hose support member 110 from the remainder of the garden hose support device 100 by pushing inwardly on the spring-loaded ball portion of the ball plunger member 107, which will enable the garden hose support assembly 132 with the hose support member 110 to be removed from the upper end of the upper tubular member 104. Then, once the hose support member 110 has been removed, the user may snap the sprinkler head attachment 140 into place on the upper end of the upper tubular member 104 (i.e., the spring-loaded ball portion of the ball plunger member 107 will snap into the aperture 144 in the sidewall of the attachment pole piece 142 of the sprinkler head attachment 140 (see FIG. 7), thereby removably securing the sprinkler head attachment 140 to the upper end of the upper tubular member 104.

Figure 8:
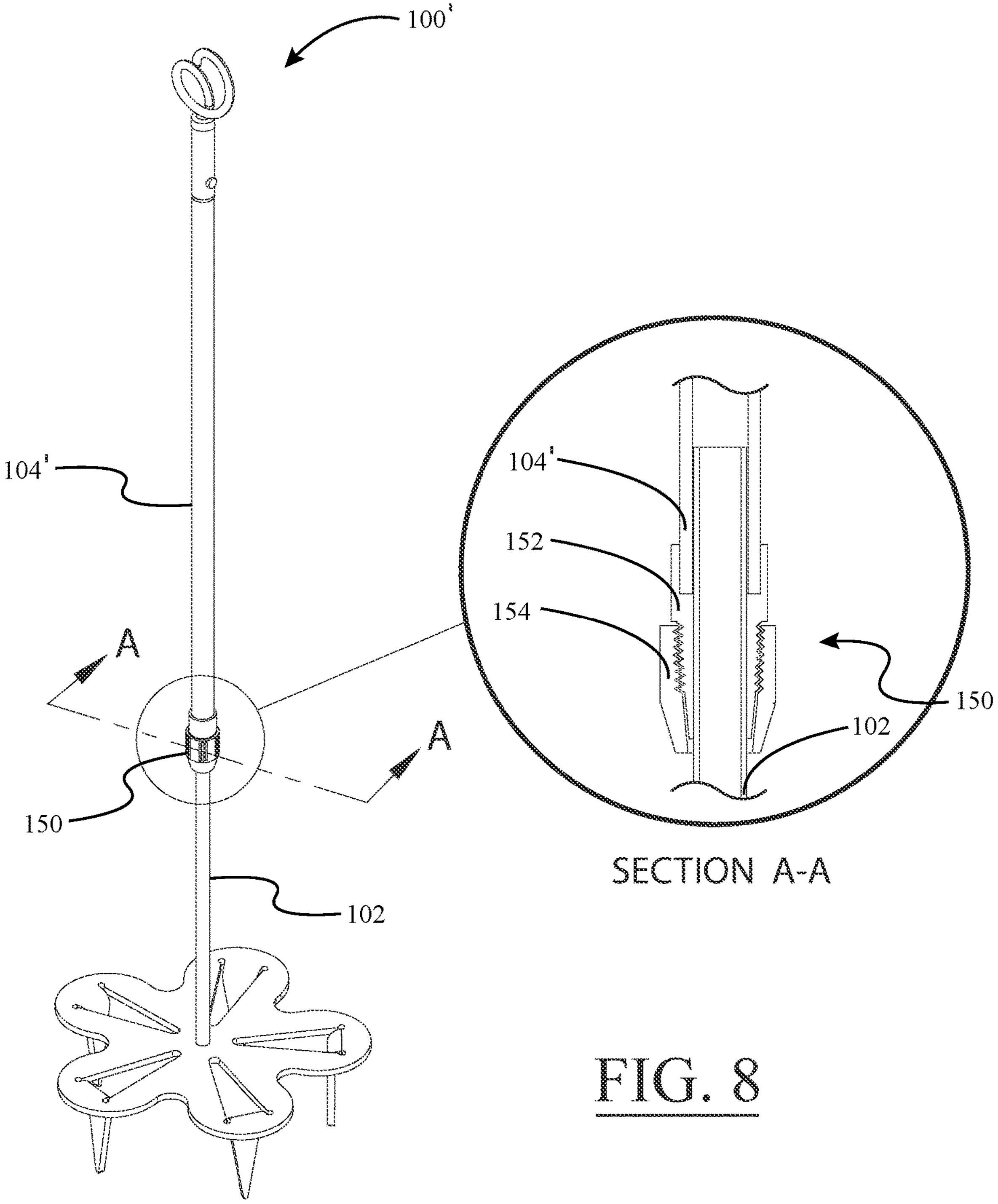
FIG. 8 depicts a perspective view and sectional view of the garden hose support device of the first illustrative embodiment with an alternative securement device provided on the shaft portion thereof, wherein the sectional cut is illustrated by cutting-plane line A-A.

Turning to FIG. 8, a garden hose support device 100' with an alternative securement device 150 provided on the shaft portion 102, 104' thereof is illustrated. The garden hose support device 100' is similar in most respects to the garden hose support device 100 described above, except that the securement device 150 in a form of a twist lock collar is substituted for the spring clip 105. As such, the upper tubular member 104' depicted in the illustrative embodiment of FIG. 8 is not required to be provided with the plurality of spaced-apart apertures 106 along its length. Referring again to the illustrative embodiment of FIG. 8, the twist lock collar 150 has an inner threaded collar portion 152 and an outer threaded collar portion 154 threadingly engaged with the inner threaded collar portion 152. In the illustrative embodiment, the upper tubular member 104' is configured to be adjusted relative to the lower tubular member 102 when the outer threaded collar 154 is rotated in a first loosening direction, and the position of the upper tubular member 104' relative to the lower tubular member 102 is configured to be fixed when the outer threaded collar 154 is rotated in a second tightening direction that is opposite to the first loosening direction.

A second illustrative embodiment of a garden hose support device is seen generally at 200 in FIGS. 9-26. Referring to these figures, it can be seen that, in most respects, the second illustrative embodiment is the same as the first illustrative embodiment. Moreover, most of the components are common to both such embodiments. For the sake of brevity, the components that the second embodiment of the garden hose support device has in common with the first embodiment will not be discussed in detail because these components have already been described above.

As shown in FIGS. 9-11 and 16, similar to the garden hose support device 100 described above, the garden hose support device 200 generally comprises a base portion 230, the base portion 230 including at least one stake member 203, 222 for being inserted into the ground to stabilize the garden hose support device 200; a shaft portion 202, 204 connected to the base portion 230, the shaft portion 202, 204 having an upper end and a lower end, the lower end being oppositely disposed relative to the upper end, and the lower end being connected to the base portion 230; and a hose support member 210 connected to the upper end of the shaft portion 202, 204, the hose support member 210 configured to support a garden hose in an elevated position above the ground. As will be explained hereinafter, in second illustrative embodiment, the garden hose support device 200 has a base portion, a pole height adjustment assembly, and a garden hose support assembly 232 that are different than the first embodiment described above.

Figure 9:
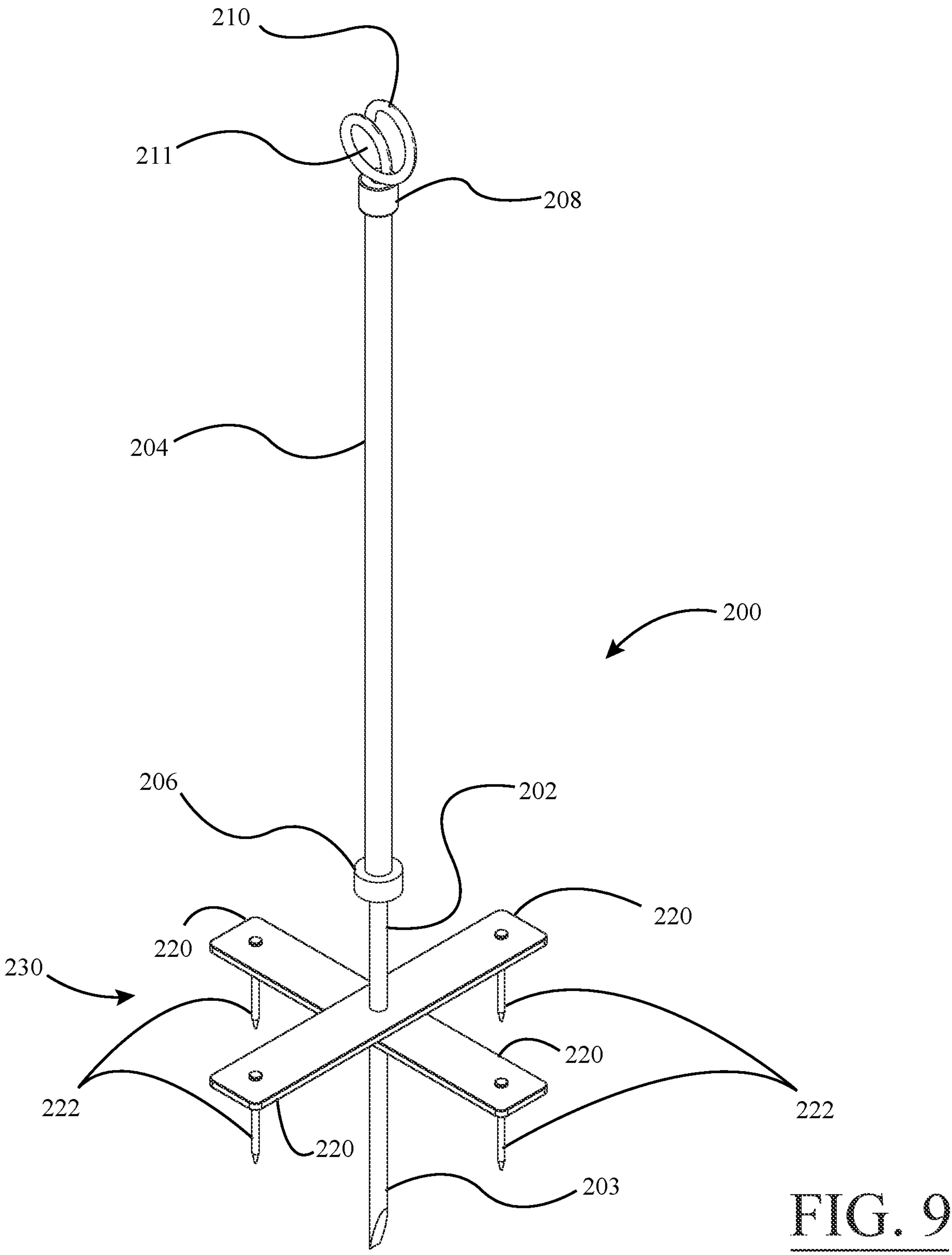
FIG. 9 is a top-side perspective view of a garden hose support device, according to a second illustrative embodiment of the invention.
Figure 10:
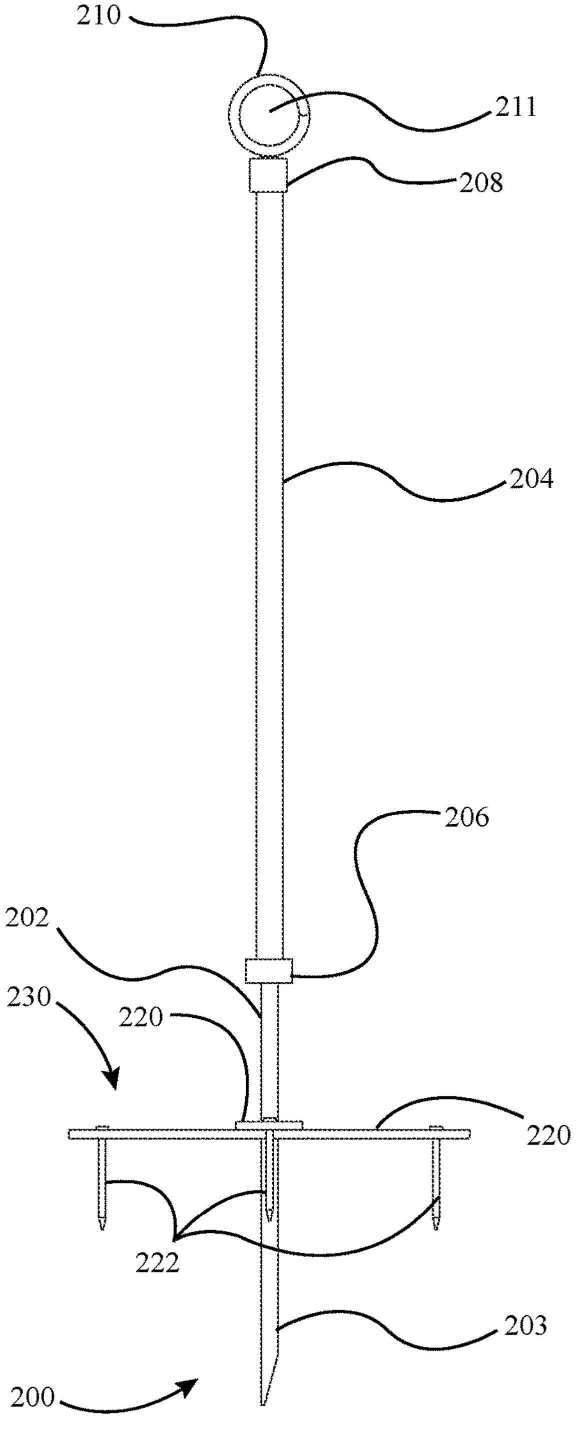
FIG. 10 is a side elevational view of the garden hose support device of FIG. 9.
Figure 11:
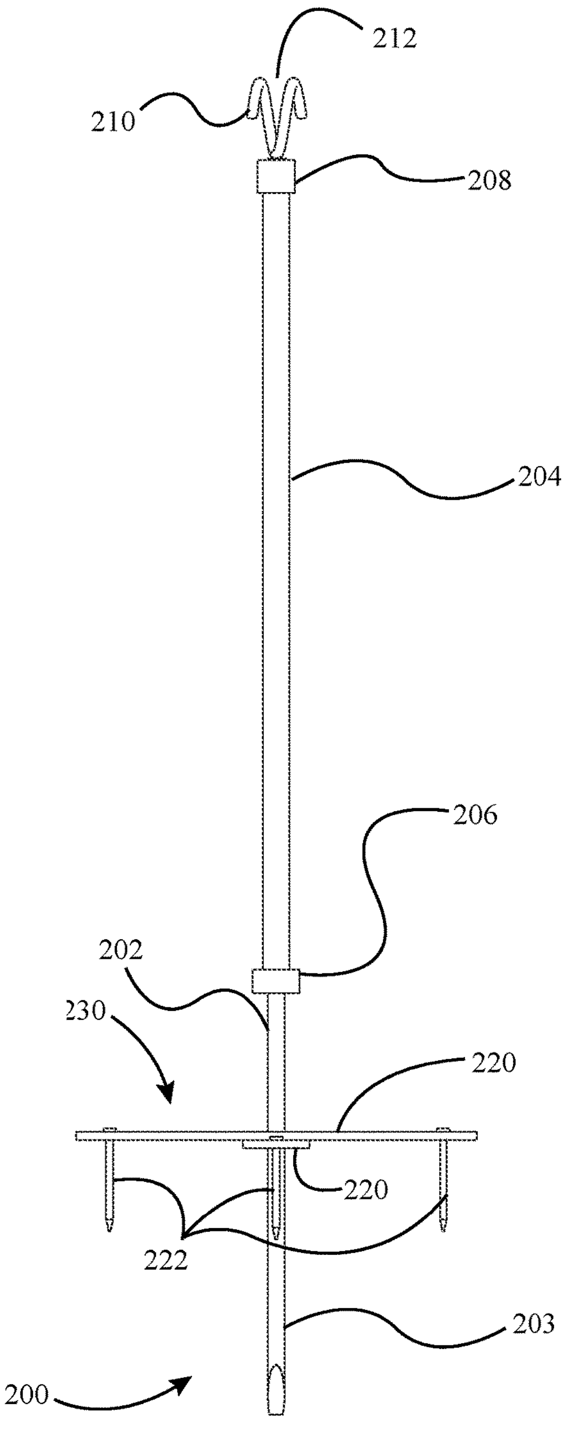
FIG. 11 is a front elevational view of the garden hose support device of FIG. 9.
Figure 12:
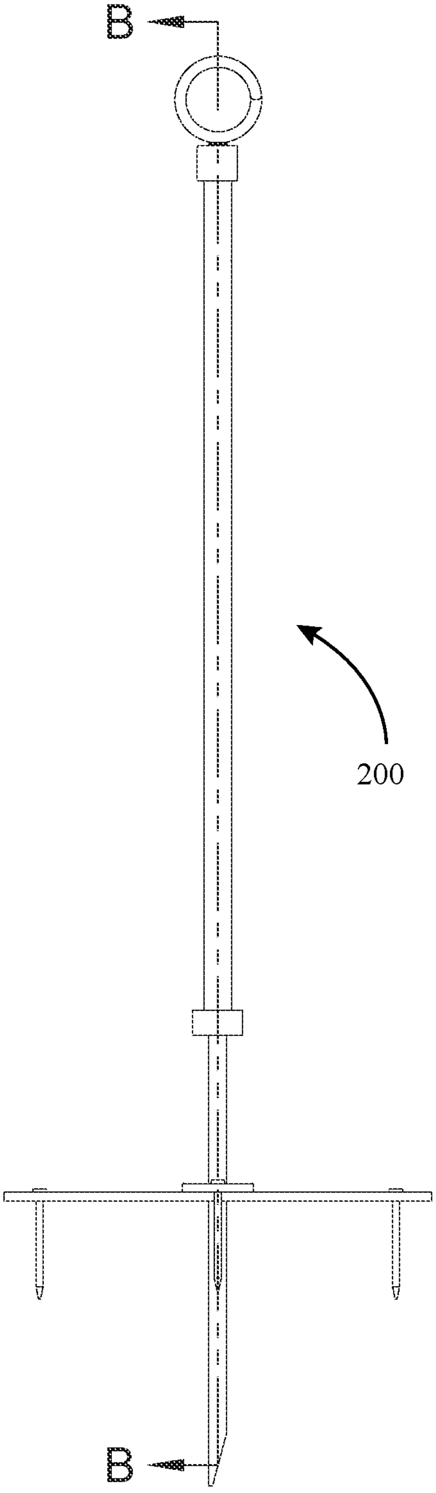
FIG. 12 is another side elevational view of the garden hose support device of FIG. 9, wherein the cutting-plane line B-B is depicted in this figure.
Figure 13:
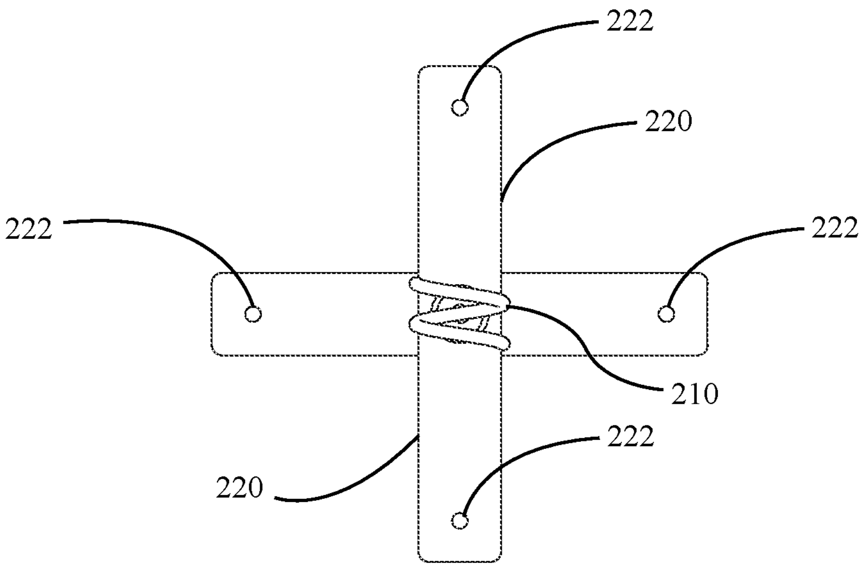
FIG. 13 is a top plan view of the garden hose support device of FIG. 9.
Figure 14:
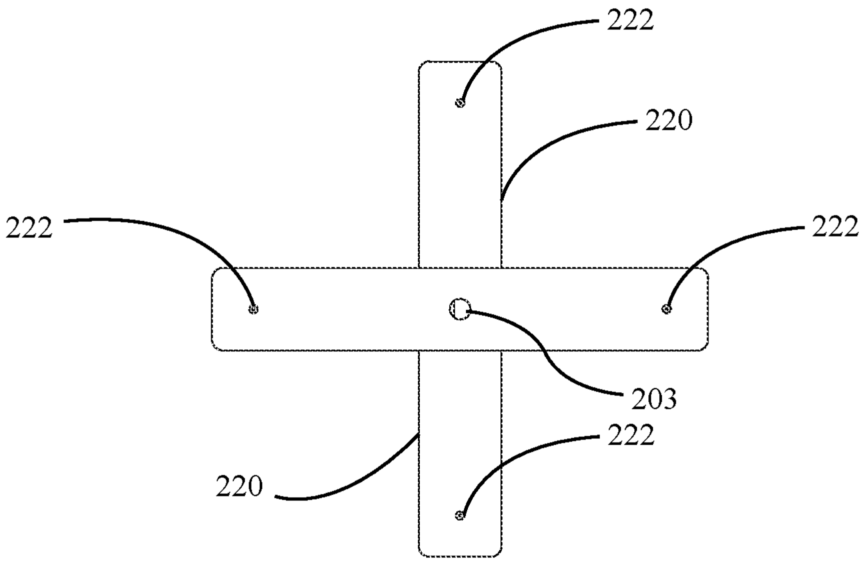
FIG. 14 is a bottom plan view of the garden hose support device of FIG. 9.
Figure 15:
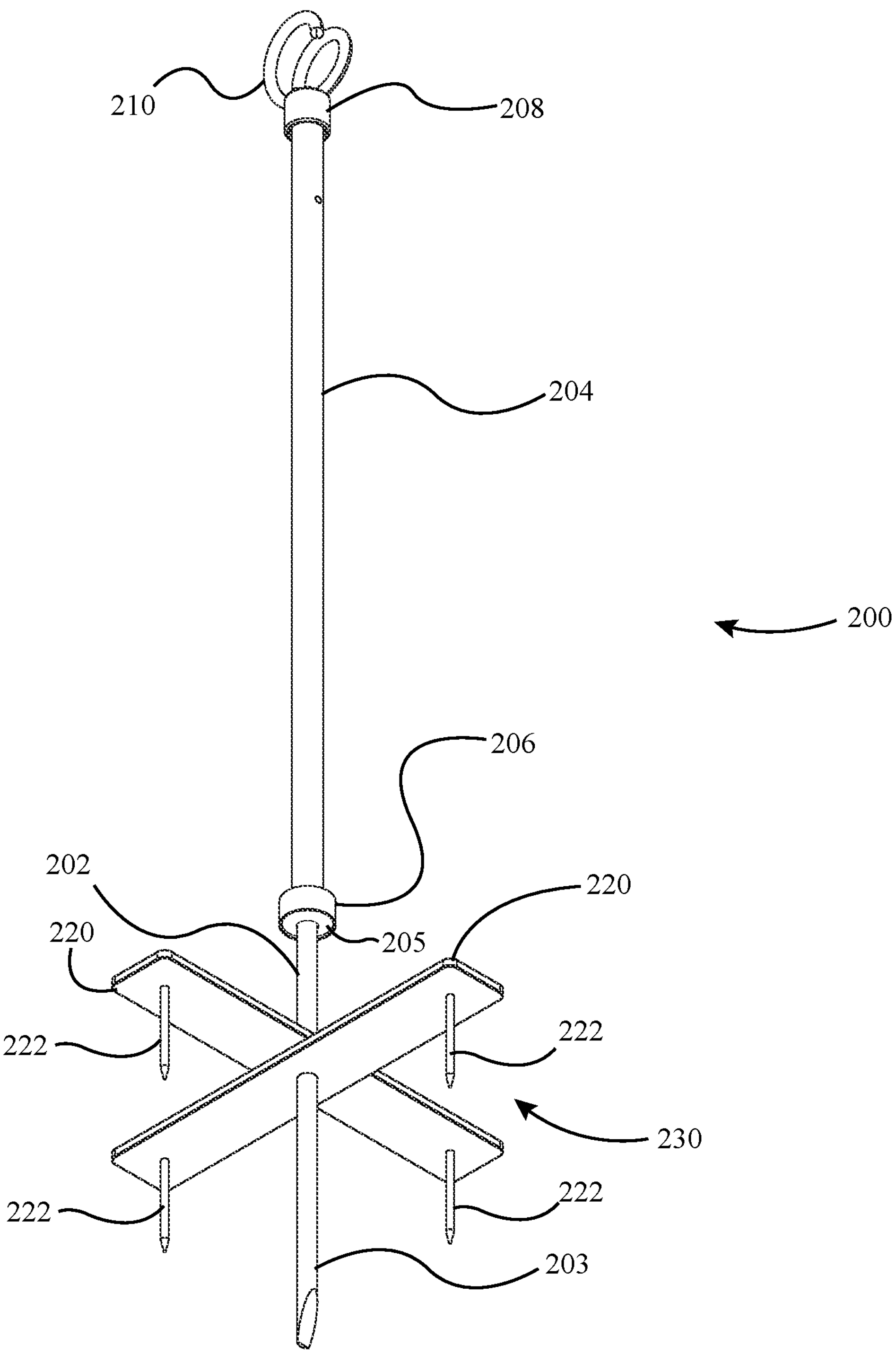
FIG. 15 is a bottom-side perspective view of the garden hose support device of FIG. 9.
Figure 16:
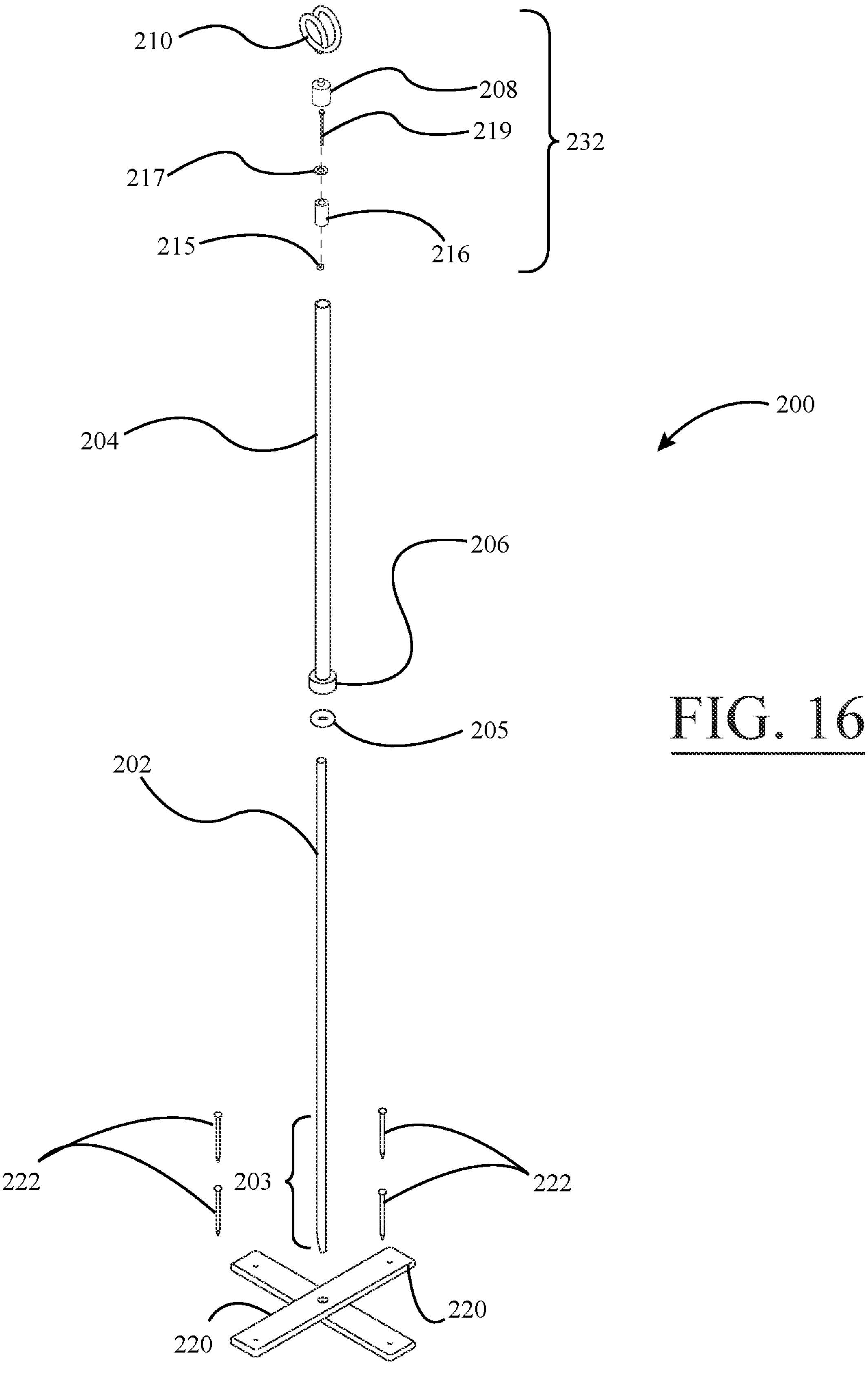
FIG. 16 is an exploded perspective view of the garden hose support device of FIG. 9.

Now, with combined reference to FIGS. 9, 15, and 16 of the second illustrative embodiment, it can be seen that the base portion 230 has a footprint that is substantially X-shaped. In the second illustrative embodiment, the base portion 230 of the garden hose support device 200 is formed by a first and second cross-members 220 arranged in an X-configuration (see FIGS. 9 and 15). Also, referring again to FIGS. 9 and 15, it can be seen that the base portion 230 of the garden hose support device 200 comprises a central stake member 203 disposed in the approximate center of the X-shaped base portion 230 for stabilizing the garden hose support device 200 in the ground. In the second illustrative embodiment, the base portion 230 of the garden hose support device 200 may further comprise a plurality of peripheral stake members 222, where each of the plurality of peripheral stake members 222 is provided proximate to a respective end of the X-shaped base portion (see FIGS. 9 and 15). As best shown in FIG. 15, the central stake member 203 has a length and diameter that is substantially greater than the lengths and diameters of the peripheral stake members 222. In the second illustrative embodiment, the peripheral stake members 222 are inserted through the first and second cross-members 220 of the base portion 230. In an alternative embodiment, a plurality of stake members 222 may be spaced apart along a length of each cross member 220 of the X-shaped base portion 230. For example, the additional stake members 222 may be generally equally spaced apart along the entire length of each cross member 220 of the X-shaped base portion 230.

Figure 22:
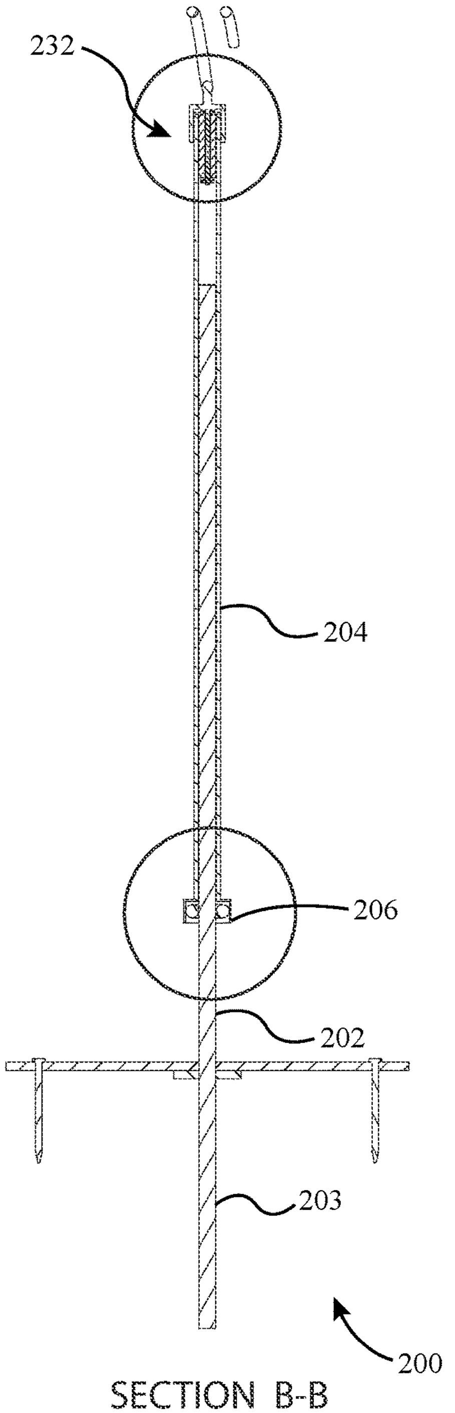
FIG. 22 is a longitudinal sectional view cut through the garden hose support device of FIG. 9, wherein the section is generally cut along the cutting-plane line B-B in FIG. 12.
Figure 23:
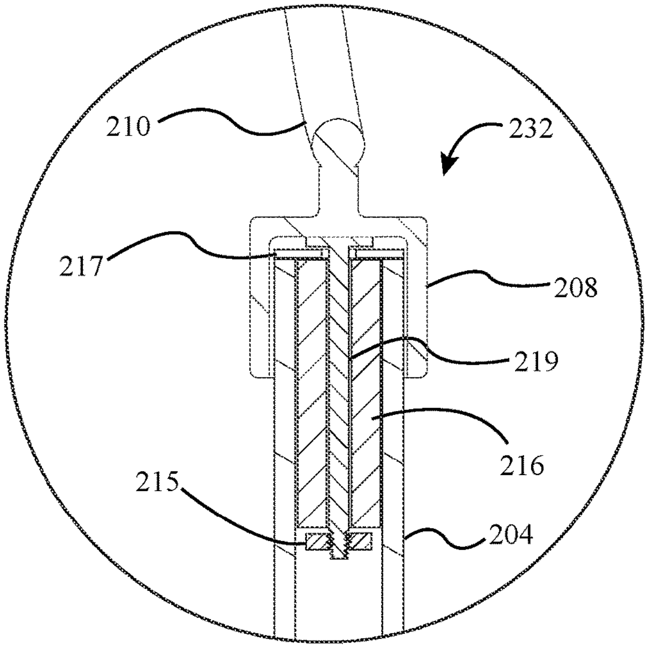
FIG. 23 is a sectional detail view of a base of the hose support member of the garden hose support device of FIG. 9 (Detail "C")
Figure 24:
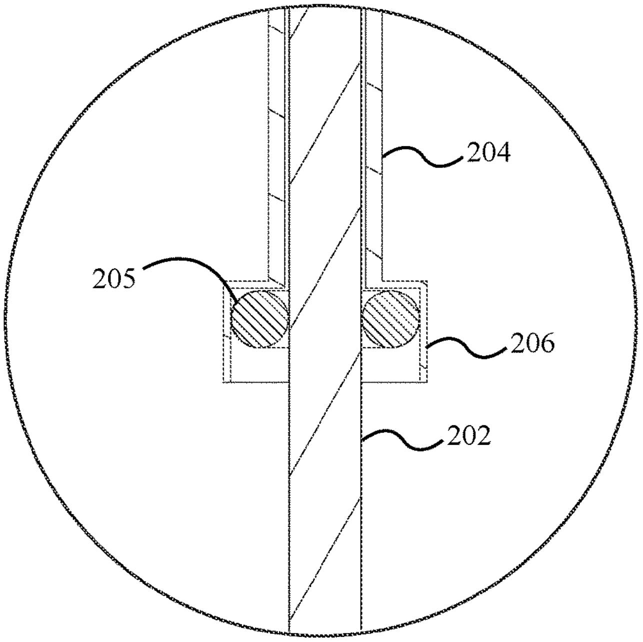
FIG. 24 is a sectional detail view of the shaft securement device of the garden hose support device of FIG. 9 (Detail "D")

Next, referring again to the second illustrative embodiment of FIGS. 9 and 15-17, it can be seen that the shaft portion 202, 204 of the garden hose support device 200 has an adjustable length, and connects the X-shaped base portion 230 to the hose support member 210 at the top of the garden hose support device 200. As shown in FIGS. 15, 16, and 22, the central stake member 203 may be an extension of the lower shaft member 202 that is received within an aperture of X-shaped base portion 230, and affixed within the aperture of X-shaped base portion 230 (e.g., by welding). Advantageously, the adjustable length of the shaft portion 202, 204 of the garden hose support device 200 allows the hose support member 210 at the top of the garden hose support device 200 to be adjustable relative to the ground for accommodating various plant watering applications.

With reference again to FIGS. 9 and 15-17 of the second illustrative embodiment, it can be seen that the adjustable shaft portion 202, 204 comprises an upper tubular member 204 telescopically received on a lower shaft member 202. The lower shaft member 202 may be in a form of a tubular member with a central cavity or a solid rod member. The height of the shaft portion 202, 204 is adjustable by means of the telescopic engagement between the upper tubular member 204 and the lower shaft member 202 (i.e., the displaceable upper tubular member 204 slides up and down on the stationary lower shaft member 202). Also, as shown in FIGS. 9 and 15-17, the garden hose support device 200 further comprises a securement device 205, 206 being configured to prevent a relative sliding movement of the upper tubular member 204 relative to the lower shaft member 202 so as to maintain a position of the upper tubular member 204 relative to the lower shaft member 202. In the second illustrative embodiment, the securement device 205, 206 comprises a ring member 205 (e.g., in a form of a rubber O-ring) coupled to the lower shaft member 202 and an annular shroud member 206 disposed on a lower end of the upper tubular member (see FIGS. 9 and 15-17). In the second illustrative embodiment, the annular shroud member 206 is configured to rest on top of the ring member 205, and the ring member 205 is configured to be selectively slid along a length of the lower shaft member 202 by a user so as to set the height of the shaft portion 202, 204. The ring member 205 is configured to prevent the upper tubular member 204 from sliding downward on the lower shaft member 202 so that the height of the shaft portion 202, 204 is maintained. In the second illustrative embodiment, the upper tubular member 204 has continual height adjustment over its range of sliding movement relative to the lower shaft member 202, rather than the discrete adjustment of the first illustrative embodiment governed by the location of the five (5) height adjustment apertures 106 along the length of the upper tubular member 104. For example, the length of the shaft portion 202, 204 of the garden hose support device 200 may be adjustable between approximately 12 inches and approximately 24 inches, inclusive of the endpoints and all intermediate values (or between 12 inches and 24 inches, inclusive of the endpoints and all intermediate values).

Figure 17:
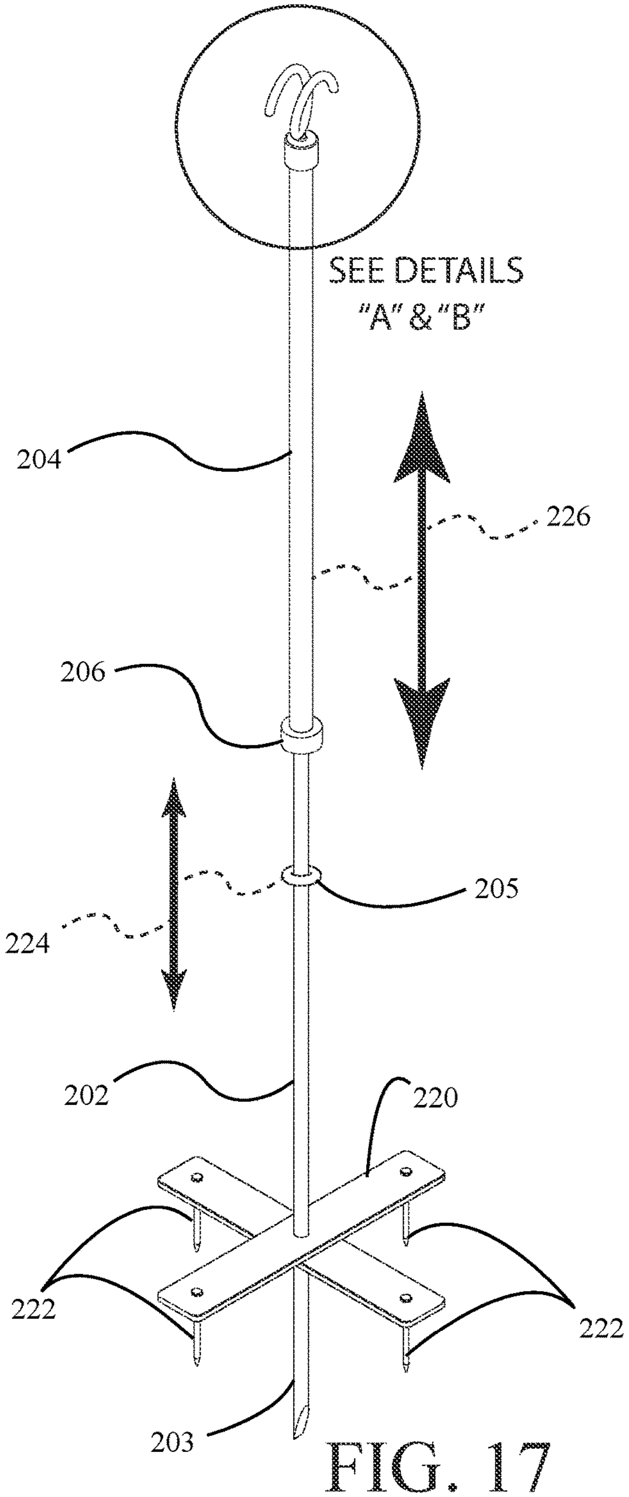
FIG. 17 is another top-side perspective view of the garden hose support device of FIG. 9, wherein the height adjustment of the shaft portion is diagrammatically illustrated in this figure.
Figure 18:
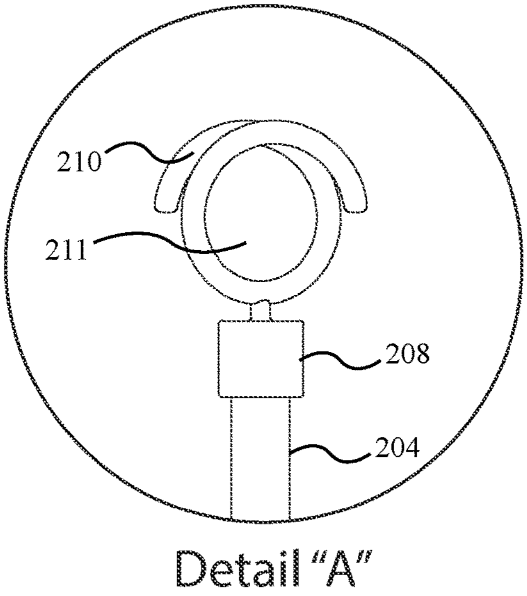
FIG. 18 is a front detail view of the hose support member of the garden hose support device of FIG. 9 (Detail "A")
Figure 19:
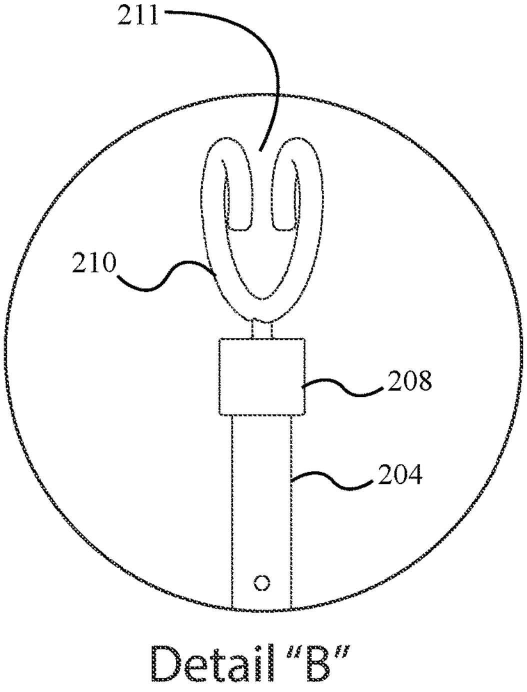
FIG. 19 is a side detail view of the hose support member of the garden hose support device of FIG. 9 (Detail "B")

With reference to the perspective view of FIG. 17, the height adjustment of the upper tubular member 204 relative to the lower shaft member 202 will be explained. Initially, as diagrammatically represented by the first vertical arrow 224 in FIG. 17, a user slides the ring member 205 to the desired position along the lower shaft member 202. The selected position of the ring member 205 sets the bottom end position of the upper tubular member 204. Then, the user lowers upper tubular member 204 onto the ring member 205, as diagrammatically represented by the second vertical arrow 226 in FIG. 17, until the bottom end of the upper tubular member 204 rests on top of the ring member 205, and the ring member 205 is covered by the annular shroud member 206 (refer to FIG. 24).

Figure 21:
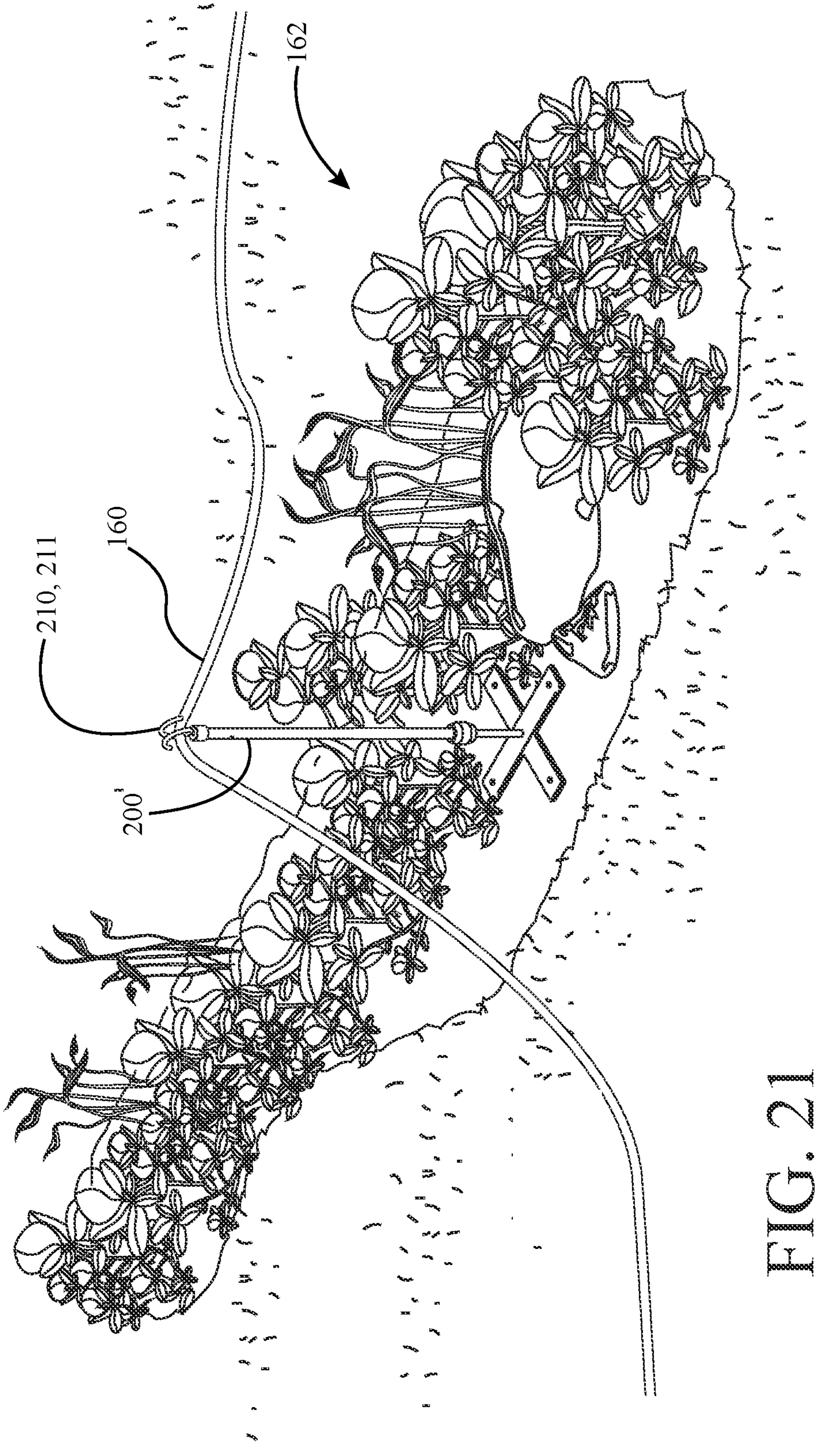
FIG. 21 is a perspective view of a garden hose support device disposed in a bed with plants, wherein a garden hose is being supported using the garden hose support device.

In the second illustrative embodiment, similar to the first illustrative embodiment, it can be seen that the hose support member 210 of the garden hose support device 200 is in a form of a spiraled clip member defining one or more voids 211, 212 for receiving a portion of the garden hose 160 therein (see e.g., FIGS. 9-11, 15, and 20). Alternative positions of garden hoses 160, 160' in the spiraled clip member are depicted in FIG. 20. Advantageously, the spiraled clip member captures and holds the garden hose 160, 160' therein. As shown in FIG. 20, the spiraled clip member 210 has a gap D1 that is slightly larger than the width D2 of the garden hose 160 so that the garden hose 160 is able to be inserted into the void 211, 212 of the spiraled clip member 210. As shown in FIG. 21, the garden hose support device 200' supports a garden hose 160 in an elevated position above the ground so that the garden hose 160 is less likely to become tangled on the plants 162 that are being watered using the hose 160 (i.e., the garden hose 160 is elevated over the plants 162 in the bed). Also, in the illustrative embodiment, the hose support member 210 is rotatable relative to the shaft portion 202, 204 about a vertical axis (i.e., the swivel base piece 208 rotates on the upper end of the upper tubular member 204—see FIGS. 15 and 16). The swivel base piece 208 operates as a cap for the upper end of the upper tubular member 204 so that water is not able to get inside of the upper tubular member 204.

Referring again to the exploded view of FIG. 16, it can be seen that, in the second illustrative embodiment, the hose support member 210 is part of a garden hose support assembly 232 where the hose support member 210 is mounted on a swivel base piece 208 (see FIGS. 9 and 15) that is attached to a press fit tube 216 by means of a bolt 219 and nut 215. In addition, a washer 217 is provided on an upper end of the press fit tube 216 in the illustrative embodiment (see FIG. 16). The press fit tube 216 is configured to be inserted into the upper end of the upper tubular member 204 in an interference-type fit to secure the garden hose support assembly 232 to the upper tubular member 204. The swivel base piece 208 rotates relative to the press fit tube 216 when the rotational position of the hose support member 210 is being adjusted.

Figure 25:
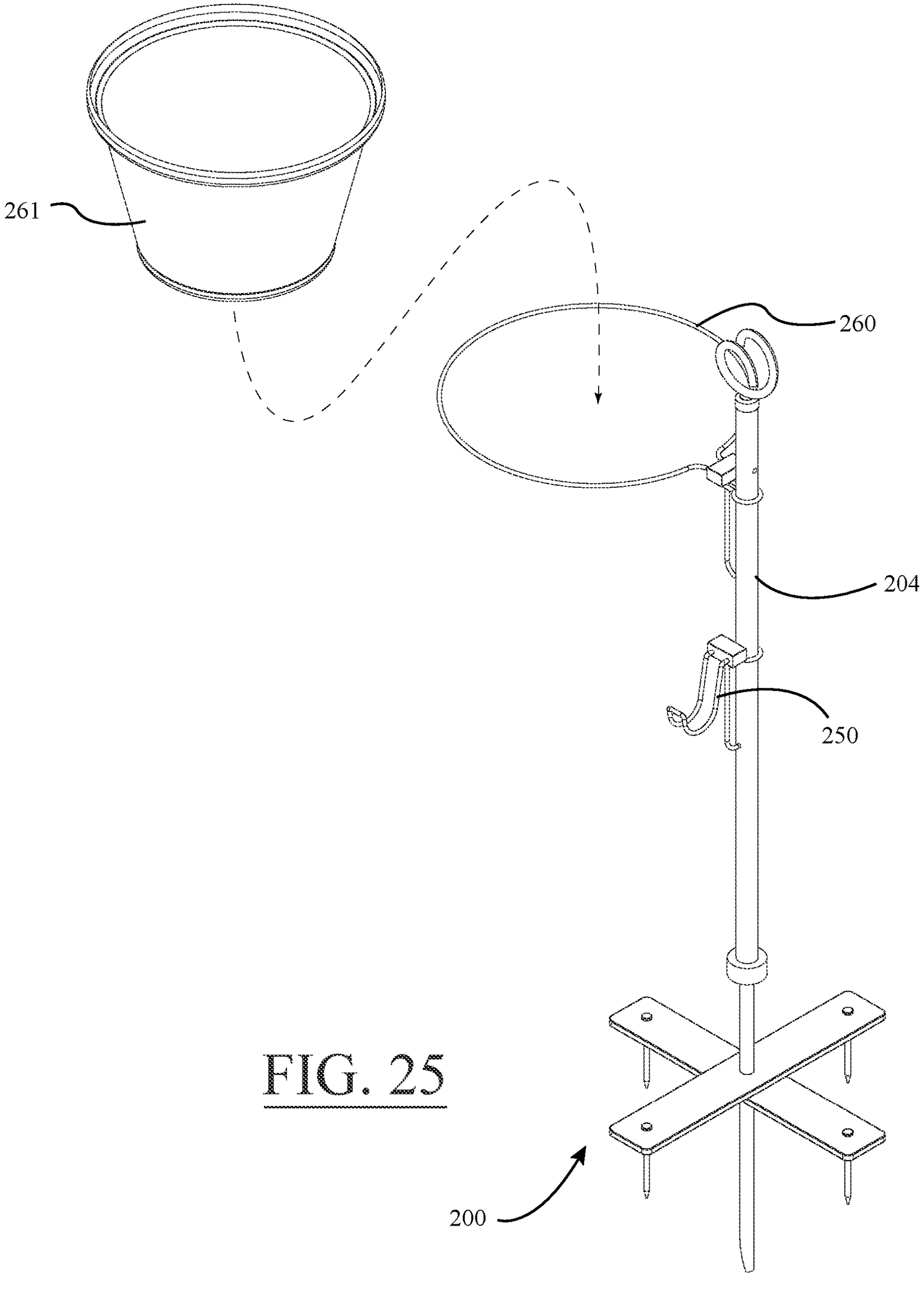
FIG. 25 is yet another perspective view of the garden hose support device of FIG. 9, wherein a plurality of hanger support devices are attached to the shaft portion of the garden hose support device, and an insertion of a plant pot into one of the hanger support devices is depicted.
Figure 26:
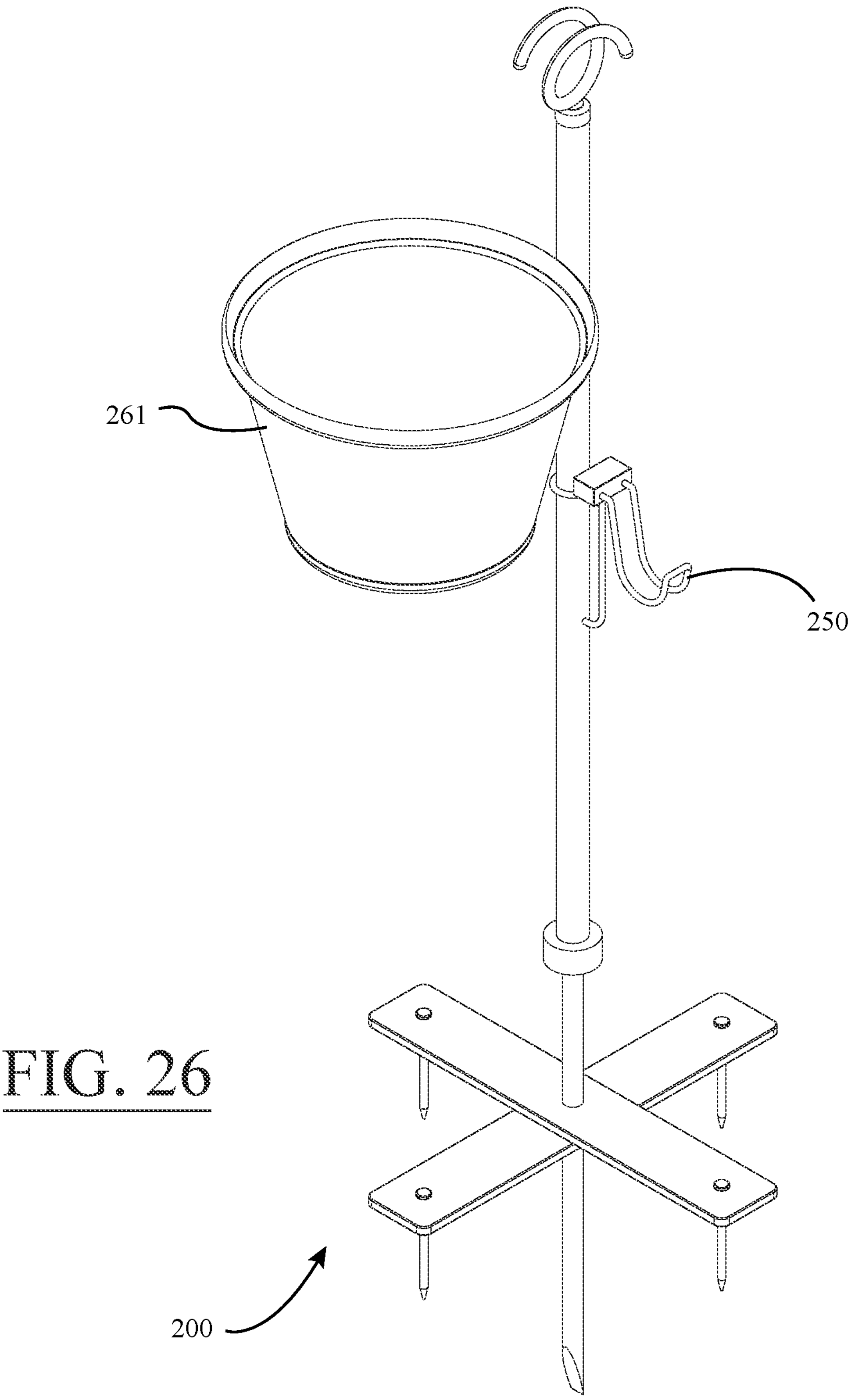
FIG. 26 is still another perspective view of the garden hose support device that is similar to FIG. 25, except that the plant pot now has been inserted into the one hanger support device.
Figure 37:
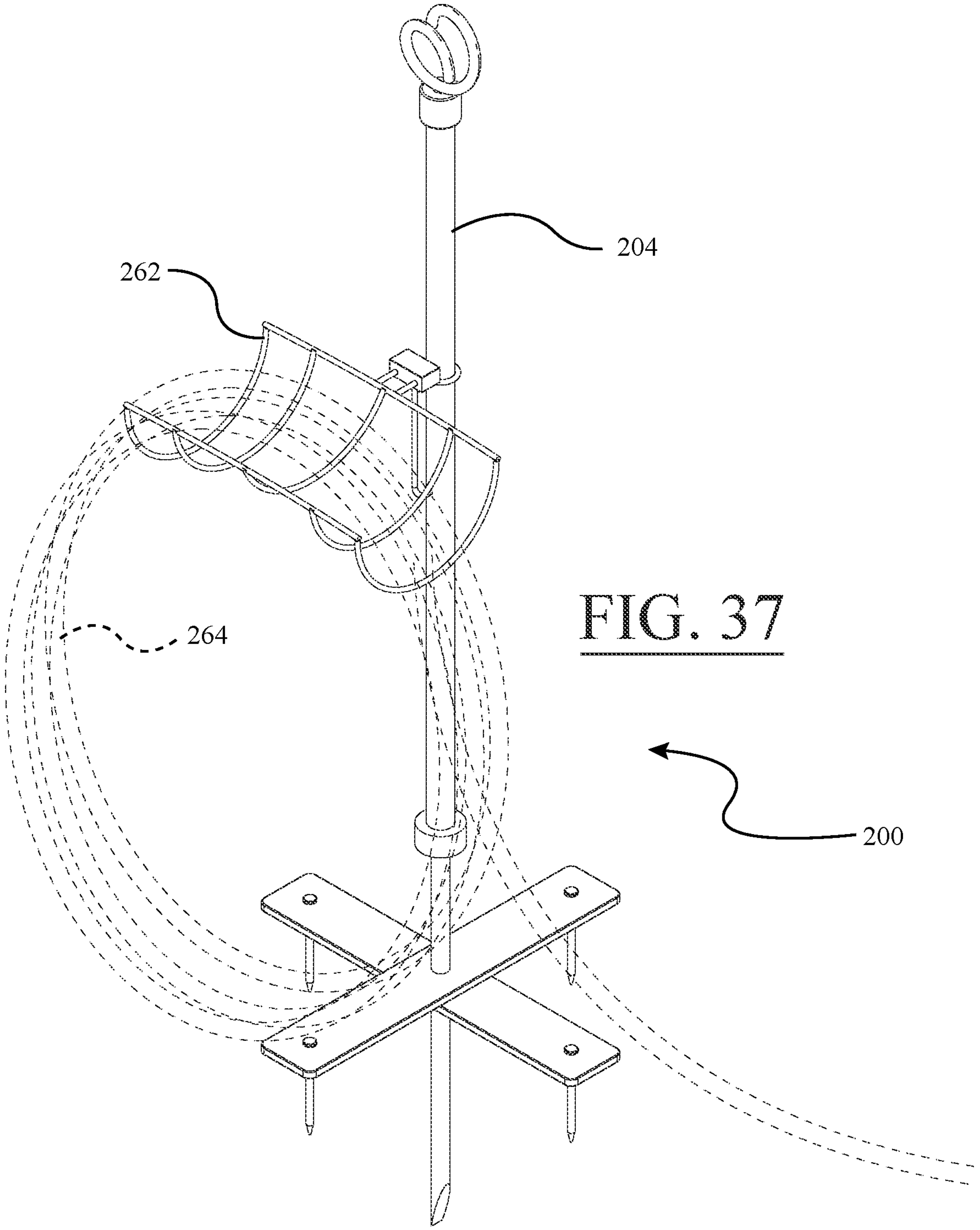
FIG. 37 is still another perspective view of the garden hose support device of FIG. 9, wherein a hanger support device for supporting a coiled garden hose is attached to the shaft portion of the garden hose support device.

Turning to FIGS. 25, 26, and 37, it can be seen that the garden hose support device 200 may further comprise one or more hanger support devices 250, 260, 262 configured to be attached along a length of the upper tubular member 204. The one or more hanger support devices 250, 260, 262 are configured to support one or more objects in a cantilevered manner from the upper tubular member 204 of the garden hose support device 200. For example, as shown in FIGS. 25 and 26, the first hanger support device 250 may comprise a hose hook device 250 for hanging a portion of the garden hose on the upper tubular member 204 of the garden hose support device 200 (e.g., the hose hook device 250 is in a form of a wire loop attachment for hanging a garden hose on a side of the garden hose support device 200). As another example, as shown in FIGS. 25 and 26, the second hanger support device 260 may comprise a plant pot holder 260 for hanging a plant pot 261 or garden tool bin on the upper tubular member 204 of the garden hose support device 200 (e.g., the plant pot holder 260 is in a form of a wire loop attachment for hanging a plant pot 261 on a side of the garden hose support device 200). As yet another example, as shown in FIG. 37, another hanger support device 262 may comprise a wire tough device 262 for hanging a coiled garden hose 264 on the upper tubular member 204 of the garden hose support device 200 (e.g., the wire trough device 262 is in a form of a wire frame attachment for supporting a coiled garden hose 264 on a side of the garden hose support device 200).

Figure 27:
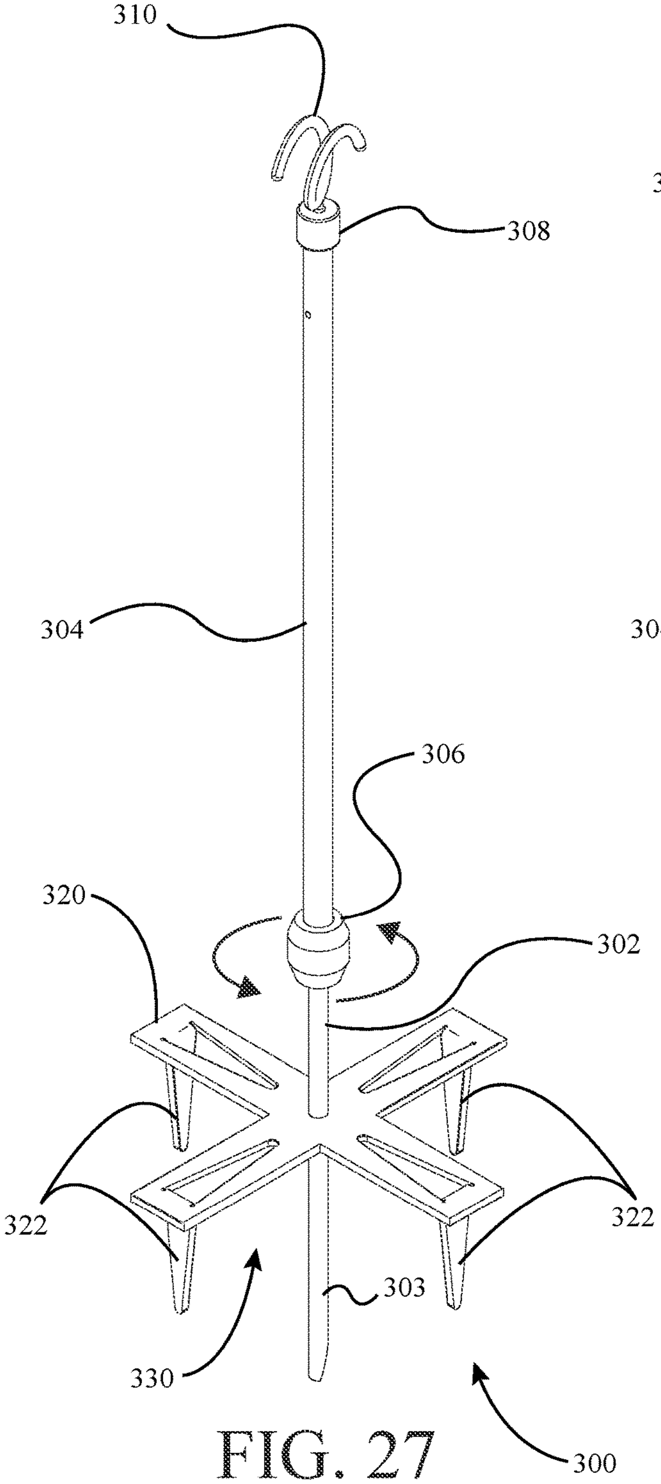
FIG. 27 is a top-side perspective view of a garden hose support device, according to a third illustrative embodiment of the invention.
Figure 28:
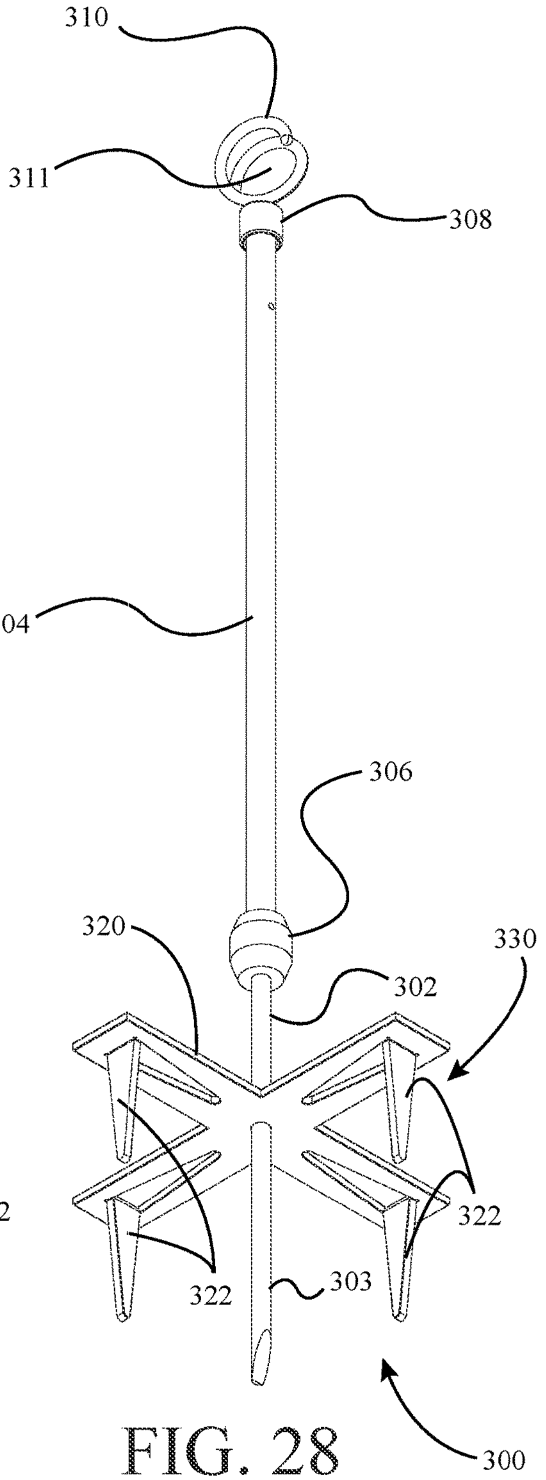
FIG. 28 is a bottom-side perspective view of the garden hose support device of FIG. 27.

A third illustrative embodiment of a garden hose support device is seen generally at 300 in FIGS. 27 and 28. Referring to these figures, it can be seen that, in many respects, the third illustrative embodiment is similar to the first and second illustrative embodiments. Moreover, most of the components are common to all of the embodiments. For the sake of brevity, the components that the third embodiment of the garden hose support device has in common with the first and second embodiments will not be discussed in detail because these components have already been described above.

As shown in FIGS. 27 and 28, similar to the garden hose support devices 100, 200 described above, the garden hose support device 300 generally comprises a base portion 330, the base portion 330 including at least one stake member 303, 322 for being inserted into the ground to stabilize the garden hose support device 300; a shaft portion 302, 304 connected to the base portion 330, the shaft portion 302, 304 having an upper end and a lower end, the lower end being oppositely disposed relative to the upper end, and the lower end being connected to the base portion 330; and a hose support member 310 connected to the upper end of the shaft portion 302, 304, the hose support member 310 configured to support a garden hose in an elevated position above the ground. As will be explained hereinafter, in third illustrative embodiment, the garden hose support device 300 has a base portion and a pole height adjustment assembly that are different than the second embodiment described above.

Now, with combined reference to the third illustrative embodiment of FIGS. 27 and 28, it can be seen that the base portion 330 has a footprint that is substantially X-shaped. As shown in FIGS. 27 and 28, the base portion 330 of the garden hose support device 300 further comprises an X-shaped base plate 320 and a plurality of stake members 322 extending downward from the X-shaped base plate 320 for stabilizing the garden hose support device 300 in the ground. In the third illustrative embodiment, similar to the first illustrative embodiment, each of the plurality of stake members 322 may be in a form of a bent, triangular spike that is stamped from the X-shaped base plate 320. Also, referring again to FIGS. 27 and 28, similar to the second embodiment, it can be seen that the base portion 330 of the garden hose support device 300 comprises a central stake member 303 disposed in the approximate center of the X-shaped base portion 330 for further stabilizing the garden hose support device 300 in the ground. As shown in FIGS. 27 and 28, the central stake member 303 may be an extension of the lower shaft member 302 that is received within an aperture of X-shaped base plate 320, and affixed within the aperture of X-shaped base plate 320 (e.g., by welding).

With reference again to FIGS. 27 and 28 of the third illustrative embodiment, it can be seen that the adjustable shaft portion 302, 304 comprises an upper tubular member 304 telescopically received on a lower shaft member 302. The lower shaft member 302 may be in a form of a tubular member with a central cavity or a solid rod member. The height of the shaft portion 302, 304 is adjustable by means of the telescopic engagement between the upper tubular member 304 and the lower shaft member 302 (i.e., the displaceable upper tubular member 304 slides up and down on the stationary lower shaft member 302). Also, as shown in FIGS. 27 and 28, the garden hose support device 300 further comprises a securement device 306 being configured to prevent a relative sliding movement of the upper tubular member 304 relative to the lower shaft member 302 so as to maintain a position of the upper tubular member 304 relative to the lower shaft member 302. In the third illustrative embodiment, the securement device 306 comprises a twist lock collar 306 to lock and unlock shaft height adjustment, which is similar in some respects to the twist lock collar 150 depicted in FIG. 8. In the illustrative embodiment, the upper tubular member 304 is configured to be adjusted relative to the lower tubular member 302 when the twist lock collar 306 is rotated in a first loosening direction, and the position of the upper tubular member 304 relative to the lower tubular member 302 is configured to be fixed when the twist lock collar 306 is rotated in a second tightening direction that is opposite to the first loosening direction. Advantageously, the twist lock collar 306 enables the upper tubular member 304 to have continual height adjustment over its range of sliding movement relative to the lower shaft member 302.

In the third illustrative embodiment, similar to the second illustrative embodiment, it can be seen that the hose support member 310 of the garden hose support device 300 is in a form of a spiraled clip member defining one or more voids 311 for receiving a portion of the garden hose therein. Also, similar to the second illustrative embodiment, the hose support member 310 is rotatable relative to the shaft portion 302, 304 about a vertical axis (i.e., the swivel base piece 308 rotates on the upper end of the upper tubular member 304). The swivel base piece 308 operates as a cap for the upper end of the upper tubular member 304 so that water is not able to get inside of the upper tubular member 304.

A fourth illustrative embodiment of a garden hose support device is seen generally at 400 in FIGS. 29-31B. Referring to these figures, it can be seen that, in many respects, the fourth illustrative embodiment is similar to the preceding illustrative embodiments. Moreover, most of the components are common to all of the embodiments. For the sake of brevity, the components that the fourth embodiment of the garden hose support device has in common with the first, second, and third embodiments will not be discussed in detail because these components have already been described above.

Figure 29:
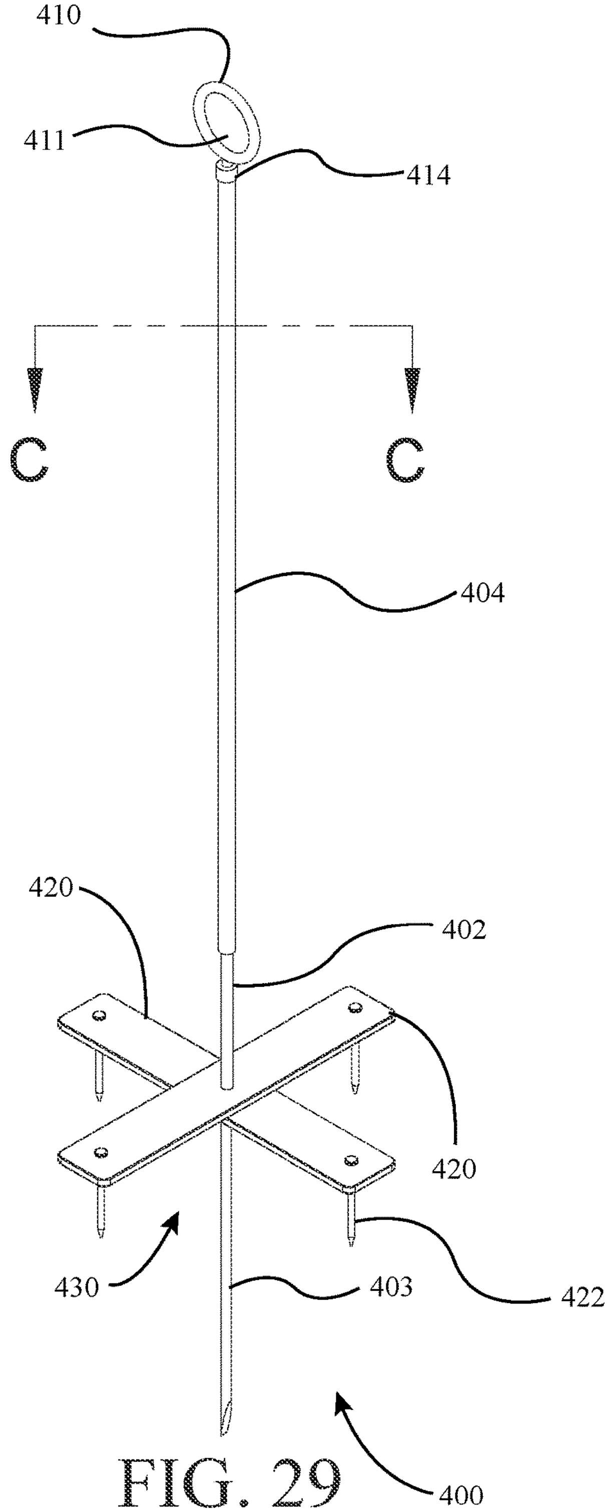
FIG. 29 is a top-side perspective view of a garden hose support device, according to a fourth illustrative embodiment of the invention, wherein the cutting-plane line C-C is depicted in this figure.
Figure 30:
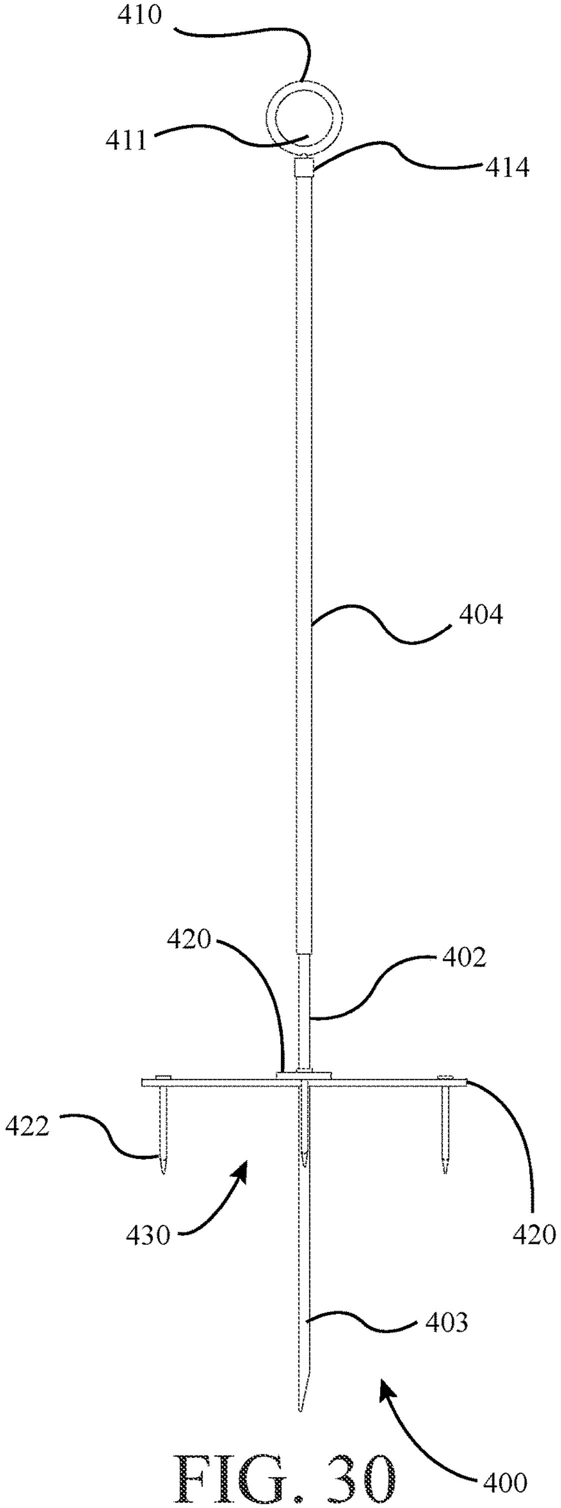
FIG. 30 is a side elevational view of the garden hose support device of FIG. 29.

As shown in FIGS. 29 and 30, similar to the garden hose support devices 100, 200, 300 described above, the garden hose support device 400 generally comprises a base portion 430, the base portion 430 including at least one stake member 403, 422 for being inserted into the ground to stabilize the garden hose support device 400; a shaft portion 402, 404 connected to the base portion 430, the shaft portion 402, 404 having an upper end and a lower end, the lower end being oppositely disposed relative to the upper end, and the lower end being connected to the base portion 430; and a hose support member 410 connected to the upper end of the shaft portion 402, 404, the hose support member 410 configured to support a garden hose in an elevated position above the ground. As will be explained hereinafter, in fourth illustrative embodiment, the garden hose support device 400 has a base portion, a pole height adjustment assembly, and a garden hose support assembly that are different than the third embodiment described above.

Now, with combined reference to the fourth illustrative embodiment of FIGS. 29 and 30, it can be seen that the base portion 430 has a footprint that is substantially X-shaped. In the fourth illustrative embodiment, the base portion 430 of the garden hose support device 400 is formed by a first and second cross-members 420 arranged in an X-configuration (see FIGS. 29 and 30). Also, referring again to FIGS. 29 and 30, it can be seen that the base portion 430 of the garden hose support device 400 comprises a central stake member 403 disposed in the approximate center of the X-shaped base portion 430 for stabilizing the garden hose support device 400 in the ground. In the fourth illustrative embodiment, the base portion 430 of the garden hose support device 400 may further comprise a plurality of peripheral stake members 422, where each of the plurality of peripheral stake members 422 is provided proximate to a respective end of the X-shaped base portion (see FIGS. 29 and 30). As best shown in FIG. 30, the central stake member 403 has a length and diameter that is substantially greater than the lengths and diameters of the peripheral stake members 422. In the fourth illustrative embodiment, similar to the second embodiment, the peripheral stake members 422 are inserted through the first and second cross-members 420 of the base portion 430. As shown in FIG. 29, the central stake member 403 may be an extension of the lower shaft member 402 that is received within apertures of the first and second cross-members 420, and affixed within the apertures of the first and second cross-members 420 (e.g., by welding).

Figure 31A:
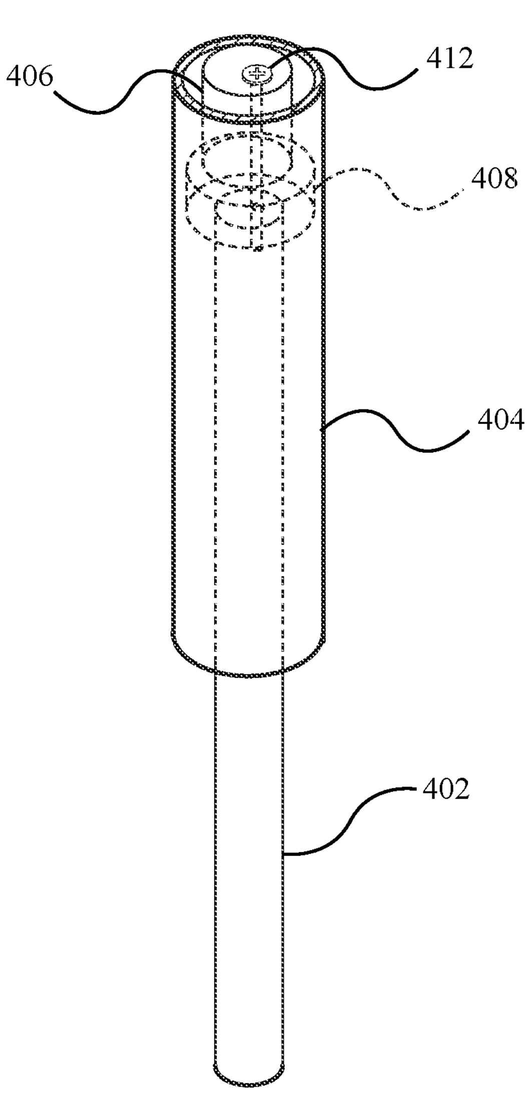
FIG. 31A is a sectional detail view of the shaft securement device of the garden hose support device of FIG. 29 in a locked configuration, wherein the section is generally cut along the cutting-plane line C-C in FIG. 29.
Figure 31B:
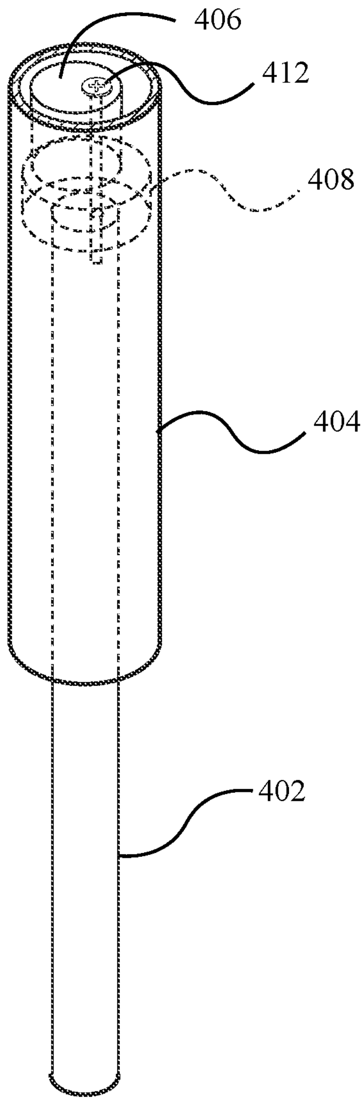
FIG. 31B is a sectional detail view of the shaft securement device of the garden hose support device of FIG. 29 in an unlocked configuration, wherein the section is generally cut along the cutting-plane line C-C in FIG. 29.

With reference again to FIGS. 29 and 30 of the fourth illustrative embodiment, it can be seen that the adjustable shaft portion 402, 404 comprises an upper tubular member 404 telescopically received on a lower shaft member 402. The lower shaft member 402 may be in a form of a tubular member with a central cavity or a solid rod member. The height of the shaft portion 402, 404 is adjustable by means of the telescopic engagement between the upper tubular member 404 and the lower shaft member 402 (i.e., the displaceable upper tubular member 404 slides up and down on the stationary lower shaft member 402). Also, as shown in FIGS. 31A and 31B, the garden hose support device 400 further comprises a securement device 406, 408 being configured to prevent a relative sliding movement of the upper tubular member 404 relative to the lower shaft member 402 so as to maintain a position of the upper tubular member 404 relative to the lower shaft member 402. In the fourth illustrative embodiment, the securement device 406, 408 comprises a cam locking device 406, 408 that includes an eccentric cylindrical component 406 disposed inside of the upper tubular member 404 (see FIGS. 31A and 31B). The eccentric cylindrical component 406 of the cam locking device 406, 408 is configured to frictionally engage an inner wall surface of the upper tubular member 404 so as to prevent the upper tubular member 404 from sliding downward on the lower tubular member 402 so that the height of the shaft portion is maintained. As shown in FIGS. 31A and 31B, the cam locking device 406, 408 further comprises an additional cylindrical component 408 beneath the eccentric cylindrical component 406. In FIG. 31A, the friction-locked position of the cam locking device 406, 408 is depicted where the eccentric cylindrical component 406 is frictionally engaging the inner wall surface of the upper tubular member 404 so as to prevent the upper tubular member 404 from sliding downward on the lower tubular member 402. In FIG. 31B, the non-engaged position of the cam locking device 406, 408 is depicted where the eccentric cylindrical component 406 is not frictionally engaging the inner wall surface of the upper tubular member 404 so that the upper tubular member 404 is able to be slidingly adjusted relative to the lower tubular member 402. As shown in FIGS. 31A and 31B, the cam locking device 406, 408 further comprises a screw 412 that attaches the upper eccentric cylindrical component 406 and the lower cylindrical component 408 to the top end of the lower tubular member 402.

In the fourth illustrative embodiment, it can be seen that the hose support member 410 of the garden hose support device 400 is in a form of an eyelet defining a circular hole 411 for receiving a portion of the garden hose therein (see FIGS. 29 and 30). Similar to the preceding illustrative embodiments, the hose support member 410 is rotatable relative to the shaft portion 402, 404 about a vertical axis (i.e., the swivel base piece 414 rotates on the upper end of the upper tubular member 404). The swivel base piece 414 operates as a cap for the upper end of the upper tubular member 404 so that water is not able to get inside of the upper tubular member 404.

Figure 32:
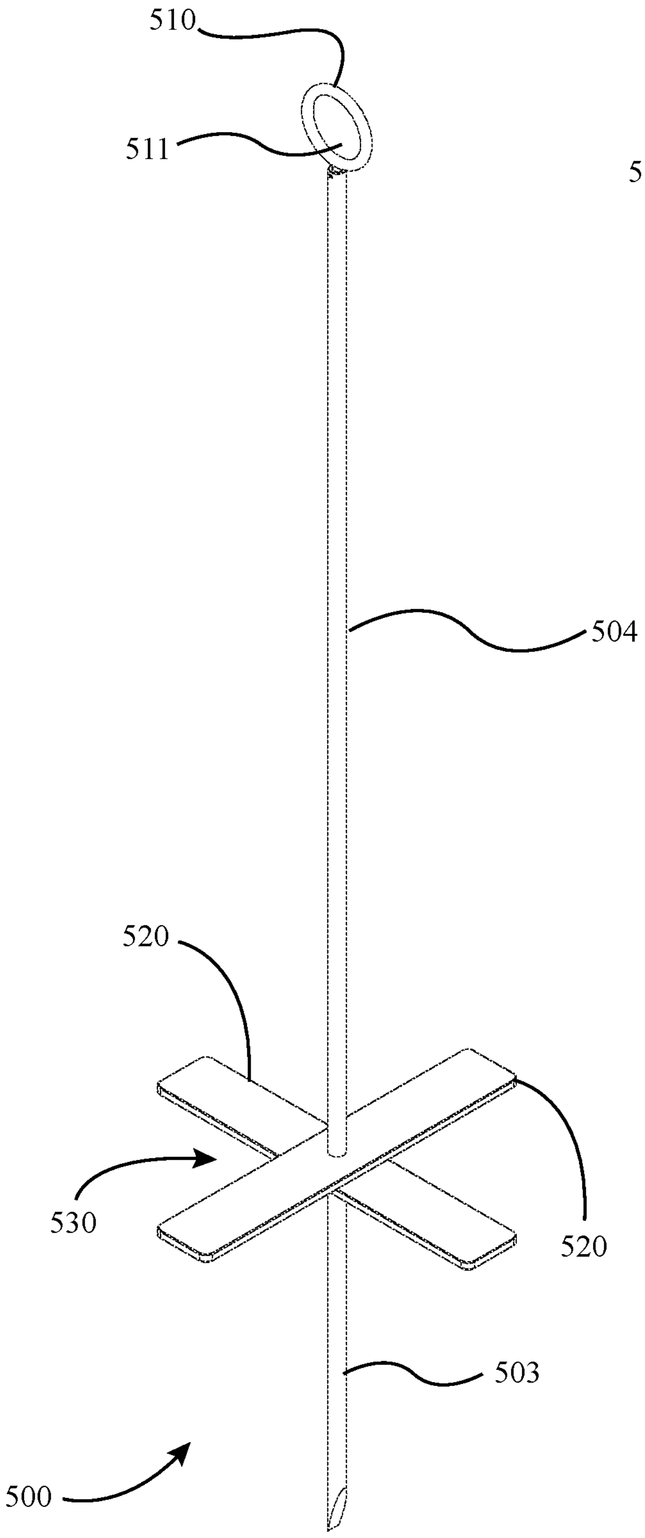
FIG. 32 is a top-side perspective view of a garden hose support device, according to a fifth illustrative embodiment of the invention.
Figure 33:
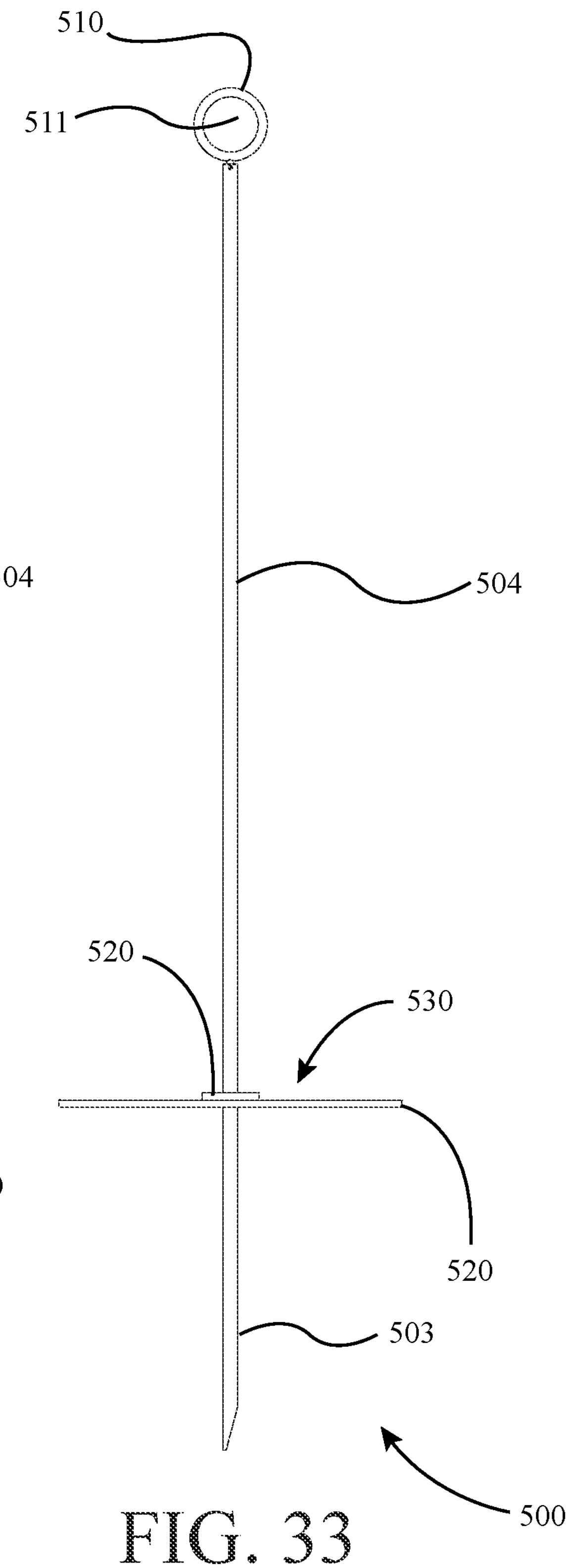
FIG. 33 is a side elevational view of the garden hose support device of FIG. 32.

A fifth illustrative embodiment of a garden hose support device is seen generally at 500 in FIGS. 32 and 33. Referring to these figures, it can be seen that, in many respects, the fifth illustrative embodiment is similar to the preceding illustrative embodiments. Moreover, some of the components are common to all of the embodiments. For the sake of brevity, the components that the fifth embodiment of the garden hose support device has in common with the first, second, third, and fourth embodiments will not be discussed in detail because these components have already been described above.

As shown in FIGS. 32 and 33, similar to the garden hose support devices 100, 200, 300, 400 described above, the garden hose support device 500 generally comprises a base portion 530, the base portion 530 including at least one stake member 503 for being inserted into the ground to stabilize the garden hose support device 500; a shaft portion 504 connected to the base portion 530, the shaft portion 504 having an upper end and a lower end, the lower end being oppositely disposed relative to the upper end, and the lower end being connected to the base portion 530; and a hose support member 510 connected to the upper end of the shaft portion 504, the hose support member 510 configured to support a garden hose in an elevated position above the ground. As will be explained hereinafter, in fifth illustrative embodiment, the garden hose support device 500 has a base portion, a shaft portion, and a garden hose support assembly that are different than the fourth embodiment described above.

Now, with combined reference to the fifth illustrative embodiment of FIGS. 32 and 33, it can be seen that the base portion 530 has a footprint that is substantially X-shaped. In the fifth illustrative embodiment, the base portion 530 of the garden hose support device 500 is formed by a first and second cross-members 520 arranged in an X-configuration (see FIGS. 32 and 33). Also, referring again to FIGS. 32 and 33, it can be seen that the base portion 530 of the garden hose support device 500 comprises a central stake member 503 disposed in the approximate center of the X-shaped base portion 530 for stabilizing the garden hose support device 500 in the ground. As shown in FIGS. 32 and 33, the central stake member 503 may be an extension of the shaft portion 504 that is received within apertures of the first and second cross-members 520, and affixed within the apertures of the first and second cross-members 520 (e.g., by welding).

In the fifth illustrative embodiment, the shaft portion 504 of the garden hose support device 500 is a one-piece pole with a fixed length, and connects the X-shaped base portion 530 to the hose support member 510 at the top of the garden hose support device 500.

Also, in the fifth illustrative embodiment, similar to the fourth embodiment, it can be seen that the hose support member 510 of the garden hose support device 500 is in a form of an eyelet defining a circular hole 511 for receiving a portion of the garden hose therein. Similar to the preceding illustrative embodiments, the hose support member 510 is rotatable relative to the shaft portion 504 about a vertical axis (i.e., the bottom pin of the hose support member 510 rotates within a central cavity at the top of the shaft portion 504—see FIG. 32).

Figure 34:
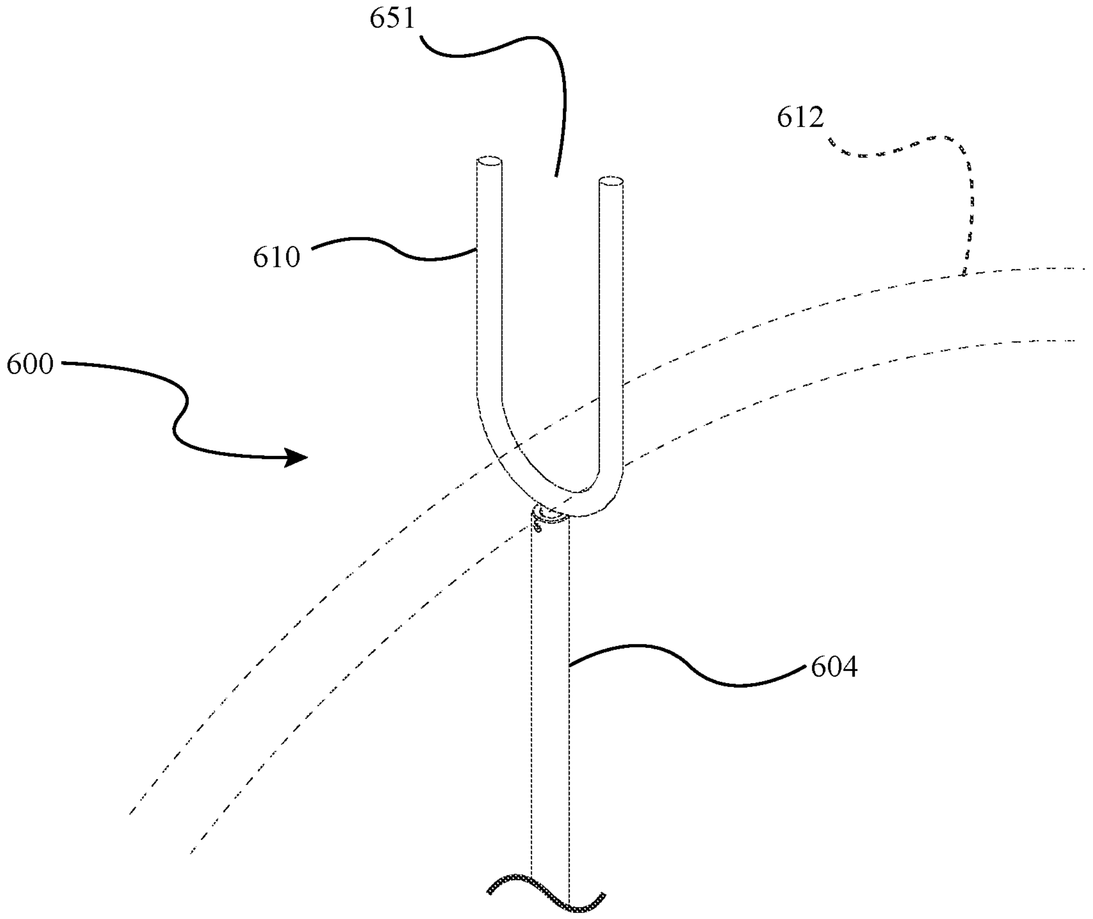
FIG. 34 is a perspective view of a hose support member of a garden hose support device, according to a sixth illustrative embodiment of the invention, wherein a garden hose depicted in dashed lines is shown being supported in the hose support member.

A sixth illustrative embodiment of a garden hose support device is seen generally at 600 in FIG. 34. The garden hose support device 600 of the sixth illustrative embodiment is generally the same as the fifth illustrative embodiment described above, except that the garden hose support device 600 is provided with a different hose support member 610. More particularly, as shown in FIG. 34, the hose support member 610 of the garden hose support device 600 is in a form of a U-shaped yoke or fork 610 defining a slot 651 for receiving a portion of the garden hose 612 therein. Similar to the preceding illustrative embodiments, the hose support member 610 is rotatable relative to the shaft portion 604 about a vertical axis (i.e., the bottom pin of the hose support member 610 rotates within a central cavity at the top of the shaft portion 604—see FIG. 34).

Figure 35:
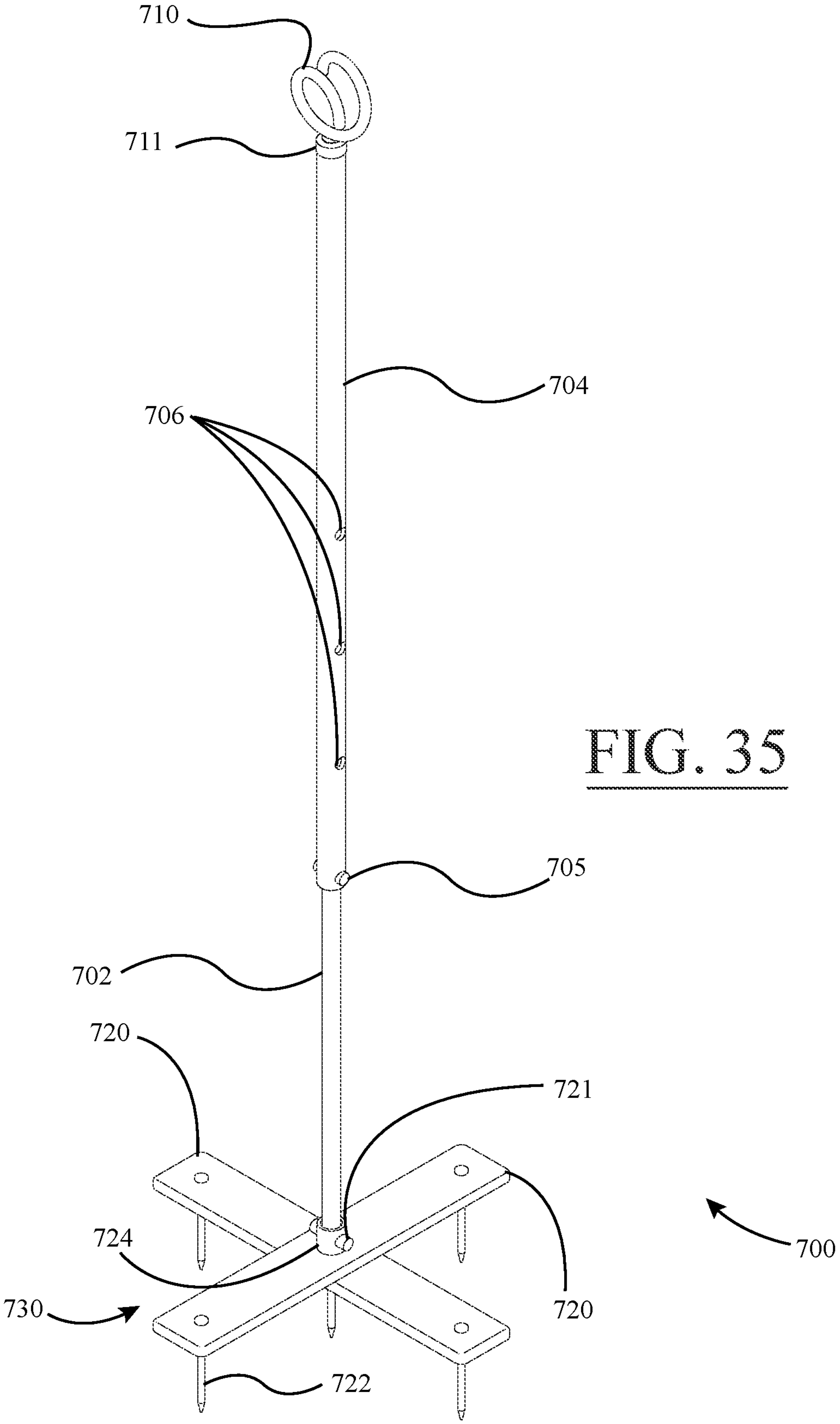
FIG. 35 is a top-side perspective view of a garden hose support device, according to a seventh illustrative embodiment of the invention.
Figure 36:
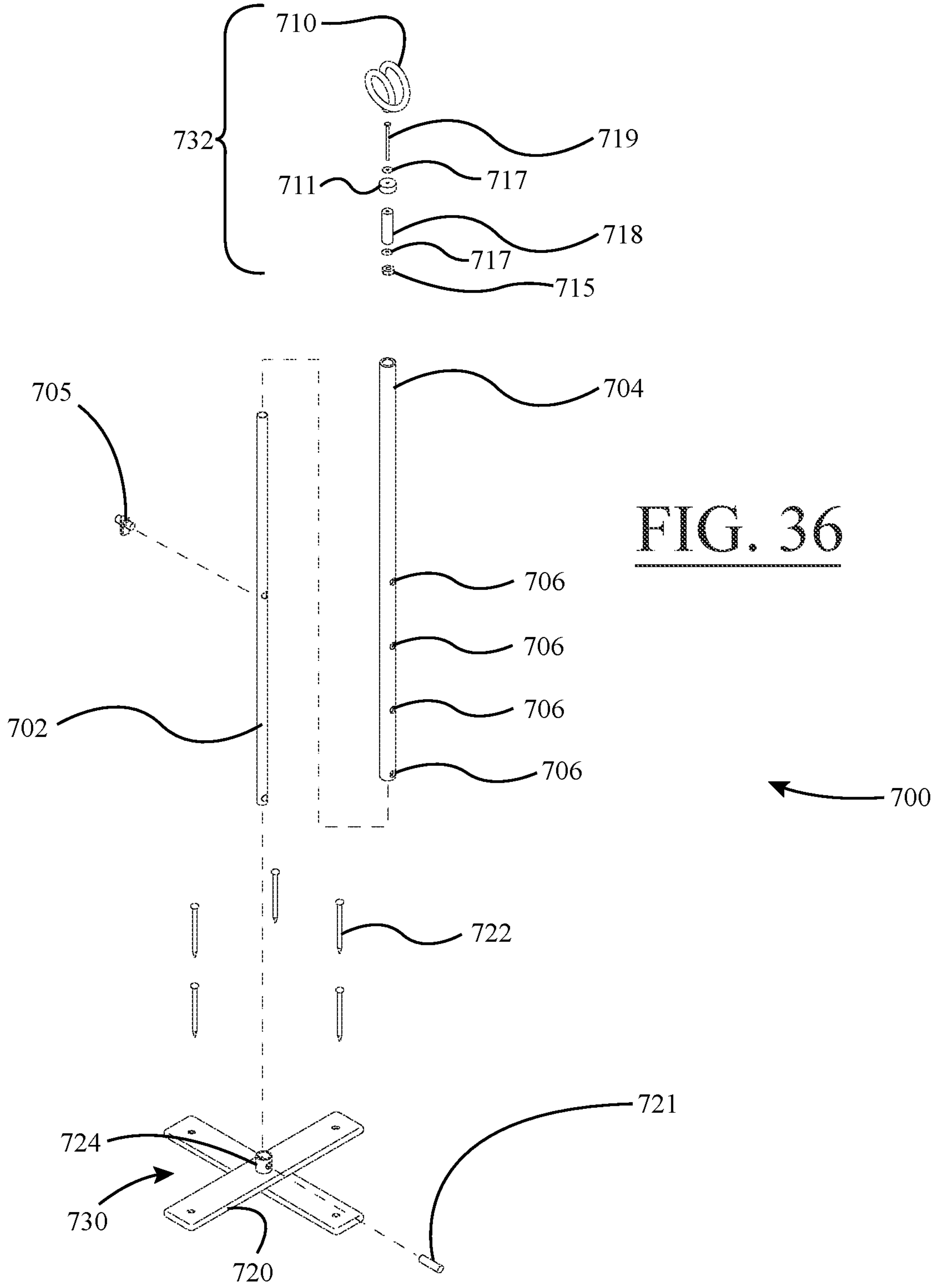
FIG. 36 is an exploded perspective view of the garden hose support device of FIG. 35.

A seventh illustrative embodiment of a garden hose support device is seen generally at 700 in FIGS. 35 and 36. Referring to these figures, it can be seen that, in many respects, the seventh illustrative embodiment is similar to the preceding illustrative embodiments. Moreover, many of the components are common to all of the embodiments. For the sake of brevity, the components that the seventh embodiment of the garden hose support device has in common with the preceding embodiments will not be discussed in detail because these components have already been described above.

As shown in FIGS. 35 and 36, similar to the garden hose support devices 100, 200, 300, 400, 500, 600 described above, the garden hose support device 700 generally comprises a base portion 730, the base portion 730 including at least one stake member 722 for being inserted into the ground to stabilize the garden hose support device 700; a shaft portion 702, 704 connected to the base portion 730, the shaft portion 702, 704 having an upper end and a lower end, the lower end being oppositely disposed relative to the upper end, and the lower end being connected to the base portion 730; and a hose support member 710 connected to the upper end of the shaft portion 702, 704, the hose support member 710 configured to support a garden hose in an elevated position above the ground. As will be explained hereinafter, in the seventh illustrative embodiment, the garden hose support device 700 has an X-shaped base, a spring clip height adjustment assembly, and a rotatable top piece.

Now, with combined reference to the seventh illustrative embodiment of FIGS. 35 and 36, it can be seen that the base portion 730 has a footprint that is substantially X-shaped. In the seventh illustrative embodiment, the base portion 730 of the garden hose support device 700 is formed by a first and second cross-members 720 arranged in an X-configuration (see FIGS. 35 and 36). Also, referring again to FIGS. 35 and 36, it can be seen that the base portion 730 of the garden hose support device 700 comprises a central stake member 722 disposed in the approximate center of the X-shaped base portion 730 for stabilizing the garden hose support device 700 in the ground. In the seventh illustrative embodiment, the base portion 730 of the garden hose support device 700 may further comprise a plurality of peripheral stake members 722, where each of the plurality of peripheral stake members 722 is provided proximate to a respective end of the X-shaped base portion (see FIG. 35). As shown in FIGS. 35 and 36, the central stake member 722 has a length and diameter that is generally equal to the lengths and diameters of the peripheral stake members 722. In the seventh illustrative embodiment, the peripheral stake members 722 are inserted through the first and second cross-members 720 of the base portion 730.

Next, referring again to the seventh illustrative embodiment of FIGS. 35 and 36, it can be seen that the shaft portion 702, 704 of the garden hose support device 700 has an adjustable length, and connects the X-shaped base portion 730 to the hose support member 710 at the top of the garden hose support device 700. As shown in FIGS. 35 and 36, the X-shaped base portion 730 may be attached to the shaft portion 702, 704 by an upstanding collar member 724 attached to X-shaped base portion 730 that receives the bottom end of the shaft portion 702, 704 therein, and the bottom end of the shaft portion 702, 704 is secured to the upstanding collar member 724 of the X-shaped base portion 730 by a fastener member 721 (e.g., in a form of a bolt). The shaft of the fastener member 721 (e.g., bolt) passes through the fastener aperture in the upstanding collar member 724 and into a corresponding fastener aperture in the bottom end of the shaft portion 702, 704. Advantageously, the adjustable length of the shaft portion 702, 704 of the garden hose support device 700 allows the hose support member 710 at the top of the garden hose support device 700 to be adjustable relative to the ground for accommodating various plant watering applications.

With reference again to FIGS. 35 and 36 of the seventh illustrative embodiment, it can be seen that the adjustable shaft portion 702, 704 comprises a larger diameter upper tubular member 704 telescopically received on a smaller diameter lower tubular member 702. The height of the shaft portion 702, 704 is adjustable by means of the telescopic engagement between the upper tubular member 704 and the lower tubular member 702 (i.e., the displaceable upper tubular member 704 slides up and down on the stationary lower tubular member 702). Also, as shown in FIGS. 35 and 36, the garden hose support device 700 further comprises a securement device 705 being configured to prevent a relative sliding movement of the upper tubular member 704 relative to the lower tubular member 702 so as to maintain a position of the upper tubular member 704 relative to the lower tubular member 702. In the seventh illustrative embodiment, similar to the first embodiment, the securement device 705 is in a form of a spring clip with a detent (refer to FIG. 36) and the upper tubular member 704 comprises a plurality of spaced-apart apertures 706 disposed along a length of the upper tubular member 704 (see FIG. 36). The detent of the spring clip 705 is configured to be selectively engaged with one of the plurality of spaced-apart apertures 706 along the length of the upper tubular member 704 so as to set the height of the shaft portion 702, 704, and the spring clip 705 is configured to be disengaged by means of a user applying a force to an outer surface of the detent so that the upper tubular member 704 is able to be adjusted relative to the lower tubular member 702. In the seventh illustrative embodiment, the upper tubular member 704 has four (4) different height adjustment settings based upon the engagement of the detent of the spring clip 705 with a selected one of the four (4) height adjustment apertures 706. For example, the length of the shaft portion 702, 704 of the garden hose support device 700 may be adjustable between approximately 12 inches and approximately 24 inches, inclusive of the endpoints (or between 12 inches and 24 inches, inclusive of the endpoints).

In the seventh illustrative embodiment, referring to FIGS. 35 and 36, it can be seen that the hose support member 710 of the garden hose support device 700 is in a form of a spiraled clip member defining one or more voids for receiving a portion of the garden hose therein. Advantageously, the spiraled clip member captures and holds the garden hose therein. Also, in the illustrative embodiment, the hose support member 710 is rotatable relative to the shaft portion 702, 704 about a vertical axis (i.e., the swivel base piece 711 rotates on the upper end of the upper tubular member 704—see FIGS. 35 and 36).

Referring again to the exploded view of FIG. 36, it can be seen that, in the seventh illustrative embodiment, the hose support member 710 is part of a garden hose support assembly 732 where the hose support member 710 is mounted on a swivel base piece 711 (see FIGS. 35 and 36) that is attached to a press fit tube 718 by means of a bolt 719 and nut 715. In addition, washers 717 are provided on opposed ends of the press fit tube 718 in the illustrative embodiment (see FIG. 36). The press fit tube 718 is configured to be inserted into the central cavity at the top end of the upper tubular member 704 in an interference-type fit (refer to FIG. 36).

In one or more other embodiments, the hose support member of the garden hose support device may be in a form of a support cradle for receiving a portion of the garden hose therein.

It is readily apparent that the aforedescribed garden hose support device 100, 200, 300, 400, 500, 600, 700 offers numerous advantages. First of all, the garden hose support device 100, 200, 300, 400, 500, 600, 700 supports a garden hose 160 in an elevated position above the ground so that the garden hose is less likely to become tangled on the plants that are being watered using the hose 160 (see FIG. 21). In addition, the garden hose support device 100, 200, 300, 400, 500, 600, 700 holds the garden hose 160 in an elevated position above the ground so as to obviate the need for the manual holding of the garden hose 160 by a user.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A garden hose support device, comprising:

a base portion, the base portion including a base plate having a central section and a plurality of peripheral sections extending outwardly from the central section, and the base portion further including a plurality of stake members for being inserted into the ground to stabilize the garden hose support device, at least some of the plurality of stake members being provided in respective ones of the plurality of peripheral sections of the base plate adjacent to respective elongate apertures in the respective ones of the plurality of peripheral sections of the base plate, at least one of the respective elongate apertures extending from a side of a respective one of the at least some of the plurality of stake members towards the central section of the base plate, and the at least one of the respective elongate apertures extending completely through the base plate from a first side of the base plate to a second side of the base plate, the second side of the base plate being oppositely disposed relative to the first side of the base plate;

a shaft portion connected to the base portion, the shaft portion having an upper end and a lower end, the lower end being oppositely disposed relative to the upper end, and the lower end being connected to the base portion; and a hose support member, the hose support member including a lower pole portion defining a central cavity, the upper end of the shaft portion configured to be received within the central cavity of the lower pole portion of the hose support member, the hose support member configured to support a garden hose in an elevated position above the ground, and the hose support member further including a first fastener member extending into an upper end of the cavity of the lower pole portion, and the hose support member additionally including a second fastener member attached to the first fastener member inside the cavity of the lower pole portion; and a removable accessory attachment that is selectively secured to the upper end of the shaft portion in place of the hose support member, wherein the accessory attachment includes an aperture at a lower portion thereof, and the upper end of the shaft portion includes a spring-loaded ball-shaped member, wherein the ball-shaped member snaps into the aperture of the accessory attachment in order to secure the accessory attachment to the upper end of the shaft portion.

2. The garden hose support device according to claim 1, wherein the base portion has a footprint that is X-shaped or multi-lobed shaped; and the plurality of stake members of the base portion further comprise a central stake member disposed in the approximate center of the X-shaped or multi-lobed shaped base portion.

3. The garden hose support device according to claim 2, wherein each of the plurality of peripheral stake members are provided proximate to a respective end of the X-shaped or multi-lobed shaped base portion.

4. The garden hose support device according to claim 3, wherein the central stake member has a length that is greater than the lengths of the peripheral stake members.

5. The garden hose support device according to claim 1, wherein a height of the shaft portion is adjustable.

6. The garden hose support device according to claim 5, wherein the shaft portion comprises an upper tubular member telescopically received on a lower tubular member, the height of the shaft portion being adjustable by means of the telescopic engagement between the upper tubular member and the lower tubular member.

7. The garden hose support device according to claim 6, further comprising a securement device being configured to prevent a relative sliding movement of the upper tubular member relative to the lower tubular member so as to maintain a position of the upper tubular member relative to the lower tubular member.

8. The garden hose support device according to claim 7, wherein the securement device comprises a spring clip with a detent and the upper tubular member comprises a plurality of spaced-apart apertures disposed along a length of the upper tubular member, the detent of the spring clip configured to be selectively engaged with one of the plurality of spaced-apart apertures along the length of the upper tubular member so as to set the height of the shaft portion, and the spring clip configured to be disengaged by means of a user applying a force to an outer surface of the detent so that the upper tubular member is able to be adjusted relative to the lower tubular member.

9. The garden hose support device according to claim 7, wherein the securement device comprises a twist lock collar having an inner threaded collar portion and an outer threaded collar portion threadingly engaged with the inner threaded collar portion, the upper tubular member configured to be adjusted relative to the lower tubular member when the outer threaded collar is rotated in a first loosening direction, and the position of the upper tubular member relative to the lower tubular member is configured to be fixed when the outer threaded collar is rotated in a second tightening direction that is opposite to the first loosening direction.

10. The garden hose support device according to claim 7, wherein the securement device comprises a ring member coupled to the lower tubular member and an annular shroud member disposed on a lower end of the upper tubular member, the annular shroud member configured to rest on top of the ring member, the ring member configured to be selectively placed along a length of the lower tubular member by a user so as to set the height of the shaft portion, and the ring member configured to prevent the upper tubular member from sliding downward on the lower tubular member so that the height of the shaft portion is maintained.

11. The garden hose support device according to claim 7, wherein the securement device comprises a cam locking device that includes an eccentric cylindrical component disposed inside of the upper tubular member, the eccentric cylindrical component of the cam locking device configured to frictionally engage an inner wall surface of the upper tubular member so as to prevent the upper tubular member from sliding downward on the lower tubular member so that the height of the shaft portion is maintained.

12. The garden hose support device according to claim 1, wherein the hose support member further comprises a spiraled clip member defining one or more voids for receiving a portion of the garden hose therein.

13. The garden hose support device according to claim 1, wherein the lower pole portion of the hose support member is detachable from the upper end of the shaft portion so that the removable accessory attachment is able to be selectively attached to the upper end of the shaft portion, the removable accessory attachment being in a form of a sprinkler head attachment, the sprinkler head attachment including a lower pole section that is configured to be removably attached to the upper end of the shaft portion.

14. The garden hose support device according to claim 1, wherein the hose support member further comprises an eyelet defining a hole for receiving a portion of the garden hose therein.

15. The garden hose support device according to claim 1, wherein the hose support member is rotatable relative to the shaft portion about a vertical axis.

16. The garden hose support device according to claim 1, wherein the hose support member further comprises a yoke for receiving a portion of the garden hose therein.

17. The garden hose support device according to claim 1, further comprising one or more hanger support devices configured to be attached along a length of the shaft portion, the one or more hanger support devices configured to support one or more objects in a cantilevered manner from the shaft portion of the garden hose support device.

18. The garden hose support device according to claim 17, wherein the one or more hanger support devices comprises a hose hook device for hanging a portion of the garden hose on the shaft portion of the garden hose support device.

19. The garden hose support device according to claim 17, wherein the one or more hanger support devices comprises a plant pot holder for hanging a plant pot on the shaft portion of the garden hose support device.

20. The garden hose support device according to claim 1, wherein the at least some of the plurality of stake members are in a form of bent, triangular spikes that are stamped from the base plate.

21. The garden hose support device according to claim 1, wherein the first fastener member of the hose support member comprises a bolt, and the second fastener member of the hose support member comprises a nut attached to the bolt inside the cavity of the lower pole portion.

* * * * *